US008613291B2

(12) United States Patent
Heffernan

(10) Patent No.: US 8,613,291 B2
(45) Date of Patent: Dec. 24, 2013

(54) APPARATUS FOR REPAIRING AND UPGRADING PIPES

(75) Inventor: John Francis Steeple Heffernan, Matching Green (GB)

(73) Assignee: NLB Engineering Limited, Matching Green, Essex (GB)

( * ) Notice: Subject to any disclaimer, the term of this patent is extended or adjusted under 35 U.S.C. 154(b) by 109 days.

(21) Appl. No.: 13/387,544

(22) PCT Filed: Jul. 29, 2010

(86) PCT No.: PCT/GB2010/051252
§ 371 (c)(1),
(2), (4) Date: Jan. 27, 2012

(87) PCT Pub. No.: WO2011/012899
PCT Pub. Date: Feb. 3, 2011

(65) Prior Publication Data
US 2012/0118404 A1    May 17, 2012

(30) Foreign Application Priority Data

Jul. 31, 2009  (GB) .................................. 0913408.1
Nov. 26, 2009  (GB) .................................. 0920714.3

(51) Int. Cl.
*F16L 55/18*   (2006.01)
*B23B 41/08*   (2006.01)
(52) U.S. Cl.
USPC ............................. 137/317; 137/318; 285/15
(58) Field of Classification Search
USPC ........ 137/317, 318, 319, 15.08, 15.09, 15.12, 137/5.13, 15.14, 315.02, 315.11, 315.01; 285/15; 138/94, 94.3, 97; 251/309
See application file for complete search history.

(56) References Cited

U.S. PATENT DOCUMENTS 1,989,768 A   2/1935   Nieman
3,687,166 A   8/1972   Herrin
(Continued)

FOREIGN PATENT DOCUMENTS

GB   2141514 A   12/1984
GB   2290361 A   12/1995
(Continued)

OTHER PUBLICATIONS

United Kingdom Search Report for Application No. GB0913408.1, dated Sep. 22, 2009, 1 page.
(Continued)

*Primary Examiner* — John K Fristoe, Jr.
*Assistant Examiner* — Kevin Barss
(74) *Attorney, Agent, or Firm* — TraskBritt

(57) ABSTRACT

Apparatus for controlling flow of fluid through a pipe, comprising: a housing configured to enclose a portion of a pipe through which fluid flow is to be controlled, the housing comprising: a first part defining a chamber configured to receive the portion of the pipe; and a second part extending from the first part, the second part defining a stowage space adjacent the chamber; a flow control device from a stowed position in the stowage space to an installed position in the chamber for selectively controlling flow through the housing, the flow control device comprising a body having a leading end defining a cutting surface for removing a section of the pipe enclosed by the housing as the flow control device moves from the stowed position to the installed position in order to form an opening in the pipe for receiving the flow control device when in the installed position; and a rotary drive mechanism for moving the flow control device from the stowed position to the installed position in response to a rotary input.

10 Claims, 25 Drawing Sheets

(56) References Cited

U.S. PATENT DOCUMENTS

| | | |
|---|---|---|
| 3,689,979 A | 9/1972 | Palat |
| 4,516,598 A | 5/1985 | Stupak |
| 4,552,170 A | 11/1985 | Margrave |
| 4,628,955 A | 12/1986 | Smith |
| 5,183,364 A | 2/1993 | Hardwig |
| 5,316,037 A | 5/1994 | Martin |
| 5,327,923 A | 7/1994 | Eischen et al. |
| 5,620,020 A | 4/1997 | Collins |
| 2008/0149873 A1 | 6/2008 | Cimberio |

FOREIGN PATENT DOCUMENTS

| | | |
|---|---|---|
| GB | 2300244 A | 10/1996 |
| GB | 2344396 A | 6/2000 |

OTHER PUBLICATIONS

International Search Report for International Application No. PCT/GB2010/051252 dated Feb. 2, 2011, 6 pages.

International Written Opinion for International Application No. PCT/GB2010/051252 dated Feb. 2, 2011, 11 pages.

APPARATUS FOR REPAIRING AND UPGRADING PIPES

CROSS-REFERENCE TO RELATED APPLICATIONS

This is a national phase entry under 35 U.S.C. §371 of International Patent Application PCT/GB2010/051252, filed Jul. 29, 2010, published in English as International Patent Publication WO 2011/012899 A2 on Feb. 3, 2011, which claims the benefit under Article 8 of the Patent Cooperation Treaty to Great Britain Patent Application Serial No. 0913408.1, filed Jul. 31, 2009, which in turn claims the benefit of the filing date of Great Britain Patent Application Serial No. 0920714.3, filed Nov. 26, 2009.

TECHNICAL FIELD

The present invention relates broadly to apparatus for use with pipes for conveying fluid (e.g., liquid or gas) and particularly, but not exclusively, to apparatus for repairing and upgrading pipes when in use conveying fluid (e.g., pressurized fluid).

BACKGROUND

It is often necessary in domestic and construction applications to repair or upgrade a section of pipe for conveying fluid around a system. For example, it may be necessary to repair a ruptured section of pipe or to fit a valve mechanism along a section of pipe close to a component in a system that is to be serviced and does not have its own isolation valve. Generally, it has in the past been necessary to shut off the fluid supply upstream of the section of pipe. This may be problematic since it may not always be possible or convenient. For example, an upstream isolation valve may be jammed open, may be leaking, or may be remote from the location of the section of pipe and may undesirably prevent fluid flow to other locations. Furthermore, isolating the fluid supply upstream of the section of pipe will not prevent residual fluid downstream of the isolation valve from undesirably leaking from the section of pipe when removed with consequential loss of fluid.

There exist means by which pipes may be frozen to form an "ice plug" to allow maintenance of a system to take place downstream of the plug. However, this method is only suitable for fluids such as water that can be frozen easily and does not lend itself to fluids such as gas or oil. Furthermore, it can take some considerable time to form the plug and to thaw the plug for system testing or operation to subsequently take place after maintenance is completed. Although techniques for cutting sections of pipe have been proposed without isolating the fluid supply, to the present applicant's knowledge, none of the techniques proposed have been successfully adopted to date. Examples of such prior art include U.S. Pat. No. 3,687,166 and U.S. Pat. No. 1,989,768.

U.S. Pat. No. 3,687,166 discloses a control valve that is configured to be introduced into a pipe filled with fluid, the control valve comprising an assembly configured to move linearly to slice through the pipe during installation and, in use, form a linear gate valve for sealing against a split gasket to isolate flow through the pipe.

U.S. Pat. No. 1,989,768 discloses apparatus for inserting a valve into a pipe, the apparatus comprising a sealable housing containing a pipe cutter for cutting a section of pipe and assembling a pair of slidable flanges about the pipe for receiving a valve after the cut section of pipe has been removed. The valve is sealably coupled to the pipe by connecting flanges located on the valve with the slidable flanges assembled about the pipe.

DISCLOSURE

The present applicant has identified the need for improved apparatus for repairing and upgrading pipes without closing fluid supply upstream in the system that are physically more compact, cheaper to manufacture and easier to install than arrangements known in the prior art. Furthermore, the present applicant has identified the need for improved apparatus for use with pressurized pipes for conveying pressurized fluid such as water, oil, gases and refrigerants.

In accordance with a first aspect of the present invention, there is provided an apparatus for controlling flow of fluid through a pipe, comprising: a housing configured to enclose a portion of a pipe through which fluid flow is to be controlled, the housing comprising: a first part defining a chamber configured to receive the portion of the pipe; and a second part extending from the first part, the second part defining a stowage space adjacent the chamber; a flow control device movable from a stowed position in the stowage space to an installed position in the chamber for selectively controlling flow through the housing, the flow control device comprising a body having a leading end defining a cutting surface for removing a section of the pipe enclosed by the housing as the flow control device moves from the stowed position to the installed position in order to form an opening in the pipe for receiving the flow control device when in the installed position; and a drive mechanism for moving the flow control device from the stowed position to the installed position.

In one embodiment, the apparatus is configured to sealably enclose the portion of the pipe. In this way, the apparatus may be used to install the flow control device when the pipe is filled with fluid.

In one embodiment, the drive mechanism for moving the flow control device comprises a rotary drive mechanism for moving the flow control device from the stowed position to the installed position in response to a rotary input.

In one embodiment, when the flow control device is in the installed position, the body is selectively configurable between an open configuration for permitting flow through the housing and a closed configuration for substantially preventing flow through the housing. In this way, an isolation device is provided that may be introduced quickly and permanently into a pressurized pipe without the need to shut off fluid supply upstream of the pipe. Advantageously, the provision of a control device that is configurable between an open and closed configuration when in its installed position allows the size of the apparatus and flow adjustment time to be minimized. A further advantage to installing a ready-assembled valve (e.g., shutoff valve) is that the seal type may be of a proven design and avoids the need to provide a dynamic seal against a split gasket.

In one embodiment, the second part comprises a collar configured to be removable from the first part when the flow control device is in the installed position. In this way, once the flow control device is in the installed position, the collar can be removed to leave only the first part of the housing in place. Advantageously, this allows the size of the apparatus once installed to be significantly minimized. The size of the apparatus is important in both domestic pipelines (which are often visible and held away from walls on stanchions by a fixed (limited) distance) and in commercial pipelines that may require excavation for repair. The removable collar may be reused to install a further flow control device so as to reduce the number of necessary components for multiple installations and thereby save costs.

In one embodiment, the cutting surface is configured to rotate relative to the housing as the flow control device moves from the stowed position to the installed position. Advantageously, a rotary cutting action may more effectively divide the section of pipe and achieve removal of the section within a reduced blade depth relative to a linear cutting device. Furthermore, the cutting surface may be configured to form the opening in the pipe defining a pair of opposed curved (e.g., circular) sealing faces for sealing against a cylindrical portion of the body when the flow control device is in the installed position.

In one embodiment, the cutting surface comprises a peripheral wall defining a central recess.

In one embodiment, the peripheral wall defines a substantially annular leading edge. In this way, a continuous cutting path is provided for removing the section of pipe enclosed by the housing. Advantageously, such a continuous cutting path may substantially minimize production of swarf during the cutting process.

In one embodiment, the substantially annular leading edge defines a cutting plane substantially perpendicular to an axis of rotation of the body.

In one embodiment, the peripheral wall has a tapered profile decreasing in thickness as the peripheral wall extends away from the body.

In another embodiment, the peripheral wall defines a pair of circumferentially spaced curved blades forming a scalloped profile. In yet another embodiment, the peripheral wall defines a plurality of circumferentially spaced teeth. Advantageously, such a sawtooth arrangement may be particularly suited to cut hard or thick sectioned pipe materials.

In one embodiment, the leading end further comprises a compression surface located within the recess defined by the peripheral wall of the cutting surface, the compression surface being configured to compress the section of pipe (e.g., during or following cutting of the pipe by the cutting surface). Advantageously, this allows the size of the removed section of pipe (which will be stored in the first part of the housing) to be minimized to reduce the size of the first part of the housing. The compression surface may be configured to compress an upper part of the section of pipe, while a lower part of the section of pipe is being cut by the cutting face. In this way, compression of the section of pipe may be achieved while using a cutting surface having a blade depth that is less than the depth (e.g., diameter) of the section of pipe.

In one embodiment, the compression surface comprises a protuberant member extending from a central part of the body. In this way, the compression surface may be configured to compress a central upper part of the section of pipe causing the section of pipe to fold inward toward a lower part of the pipe section rather than spreading outward during the installation process. Advantageously, such a folding action will tend to reduce jamming of the cut pipe against the leading end of the body and first part of the housing, thereby significantly reducing the force required to cut through the pipe and torque on the pipe. This may alleviate the need for an installer to provide a counter-rotational torque during installation (e.g., holding a wrench against the housing). Furthermore, the folding action allows the removed section of pipe to fold into a suitable profile for storage in the first part of the housing.

In one embodiment, the protuberant member has a substantially cylindrical profile. The cutting surface may comprise a peripheral cutting surface spaced from the protuberant member by an annular recess. In the case of a cutting surface defining a cutting plane substantially perpendicular to an axis of rotation of the body, the protuberant member may comprise an outermost surface (e.g., flat outermost surface) extending substantially along or through the cutting plane. In another embodiment, the protuberant member may define an outermost surface recessed from the cutting plane.

In another embodiment, the protuberant member comprises a peripheral wall defining a central recess. For example, the peripheral wall may define a substantially annular leading edge (e.g., concentric with the substantially annular leading edge defined by the cutting surface). Advantageously, the use of a protuberant member with a central recess has been found to allow compression of the section of pipe with minimal force.

In one embodiment, the substantially annular leading edge of the protuberant member defines a compression plane substantially perpendicular to the axis of rotation of the body. In one embodiment, the peripheral wall of the protuberant member has a tapered profile decreasing in thickness as the peripheral wall extends away from the body.

In the case of a cutting surface defining a cutting plane substantially perpendicular to axis of rotation of the body, the protuberant member may comprise an outermost surface extending substantially along or through the cutting plane. In another embodiment, the protuberant member may define an outermost surface recessed from the cutting plane.

In one embodiment, the first part further comprises a compartment adjacent the chamber for receiving the leading end of the flow control device and removed section of pipe when the flow control device is in the installed position. In the case that the leading end comprises a compression surface configured to compress an upper part of the section of pipe while a lower part of the section of pipe is being cut by the cutting face, the compartment may have a depth that is less than substantially 70% of a corresponding depth of the chamber. In one embodiment, the compartment may have a depth of less than substantially 60% of the corresponding depth of the chamber. In one embodiment, the compartment may have a depth of less than substantially 50% of the corresponding depth of the chamber. In one embodiment, the compartment may have a depth of less than substantially 40% of the corresponding depth of the chamber.

The compartment may define a curved lower surface. For example, in the case of a leading end including a compression surface comprising a protuberant member extending from a central part of the body, the compartment may define a curved lower surface configured to receive (e.g., snugly receive) a correspondingly curved pipe remnant formed by the protuberant member during installation of the apparatus. Advantageously, the provision of a compartment having such a curved lower surface allows an outer profile of the first part of the housing to be curved (e.g., include curved corners). In this way, apparatus installed in a pipe located at a standard pitch away from a wall (e.g., mounted on industry standard-sized stanchions) may be configured to be rotatable around the pipe following installation. This may allow the apparatus to be installed in a first (e.g., more convenient) orientation relative to the pipe and then moved into a desired second orientation relative to the pipe after installation without having to remove the pipe from its stanchions.

In one embodiment, the flow control device comprises an open bore extending through the body. The flow control device may further comprise a valve configurable between a first configuration for allowing fluid to pass through the open bore and a second configuration for substantially preventing fluid from passing through the open bore and an actuator for controlling the valve. The flow control device may further comprise a pair of opposed seals for forming a sealed passageway between opposed ends of the pipe and the open bore. The actuator may comprise a rotary actuator. The valve may be selectively configurable between the open configuration and the closed configuration in response to a 90 degree rotary input. In one embodiment, the valve comprises a rotatable ball valve.

In one embodiment, the body has a trailing end having a substantially cylindrical outer surface and the second part defines a sleeve having a cylindrical inner surface for receiving the body.

The rotary drive mechanism may comprise a pair of interengaging screw-threaded portions. In one embodiment, the interengaging screw-threaded portions are located on the inner surface of the second part and the outer surface of the trailing end of the body, respectively. For example, in the case of a second part comprising a collar, the pair of interengaging screw-threaded portions may be located on an inner surface of the collar and an outer surface of the trailing end of the body, respectively. In one embodiment, the interengaging screw-threaded portions further comprise a screw-threaded portion located on an inner surface of the first part for interengaging with the screw-threaded portion on the outer surface of the trailing end of the body. This arrangement may be particularly useful where the second part comprises a collar configured to be removable from the first part when the flow control device is in the installed position. The screw-threaded portion located on the inner surface of the first and second parts may be contiguous when the first and second parts are connected together.

In the case of apparatus including a second part comprising a collar and a screw-threaded portion located on an inner surface of the first part, the collar and first part may comprise a further pair of interengaging screw-threaded portions spaced radially outward from the screw-threaded portions located on the inner surface of the collar and the inner surface of the first part. The further pair of interengaging screw-threaded portions may be synchronized with the screw-threaded portions located on the inner surface of the collar and the inner surface of the first part (e.g., with the further pair of interengaging screw-threaded portions having the same or a different pitch to the screw-threaded portions located on the inner surface of the collar and the inner surface of the first part). In this way, correct alignment of the screw-threaded portions located on the inner surface of the collar and the inner surface of the first part may be achieved without the need for accurate rotational positioning of the collar relative to the first part. In one embodiment, the further pair of interengaging screw-threaded portions are located on an inner surface of the collar and outer surface of the first part, respectively.

The first part may comprise a two-part casing. For example, the first part may comprise a first (e.g., an upper) casing part and a second (e.g., lower) casing part. The two-part casing may be clamped together once positioned around the portion of pipe.

In one embodiment, at least one of the first and second casing parts comprises a gripping surface configured to grip an outer periphery of the pipe (e.g., metal or plastic pipe) at a location spaced from the section of pipe to be removed. The peripheral gripping surface may comprise a first gripping surface part located on the first casing part and a second gripping surface part located on the second casing part. The first and second gripping parts may combine together to form at least one gripping ring when the first and second casing parts are coupled together. In one embodiment, the first and second gripping parts combine together to form a pair of longitudinally spaced gripping rings (e.g., located at opposed ends of the first part).

In one embodiment, the first and second casing parts are configured to be connected together (e.g., clamped together) by means of at least one bolt to enclose (e.g., sealably enclose) the portion of pipe. In one embodiment, the at least one bolt is a shear bolt comprising a rotatable head (e.g., profiled head such as a hexagonal head) configured to detach once an applied installation torque exceeds a predetermined level. For example, the head may be tapered to narrow to a reduced cross-section so that the head separates from a stem of the bolt once the installation torque exceeds a predetermined level. Advantageously, the use of such a shear bolt allows the clamping force applied to the first and second casing parts to be accurately controlled.

In one embodiment, the collar may define one or more notches (e.g., a plurality of laterally spaced notches) for engaging the at least one bolt. For example, the collar may comprise a peripheral flange including one or more laterally spaced notches. In this way, unwanted rotational movement of the collar relative to the first part may be prevented during installation. Since the collar cannot be removed while the interengaging screw-threaded portions of the rotary drive mechanism are engaged, the collar cannot be removed from the first part until the flow control device is fully installed. In this way, the collar cannot be removed prematurely and, therefore, the risk of installation error is further minimized.

In one embodiment, the first part comprises at least one strengthening member. For example, the first part may comprise at least one strengthening member (e.g., strengthening plate) coupled to the first (e.g., upper) casing part. In this way, a casing material having a relatively low flexural modulus may be used in combination with a strengthening member formed from a material having a relatively high flexural modulus, with the strengthening member providing resistance to flexing of the first casing part during cutting of the pipe. In one embodiment, the strengthening member is received in a recess formed in an upper surface of the first casing part. The strengthening member may be clamped to the upper surface of the first casing part by at least one bolt (e.g., the strengthening member may comprise one or more notches for engaging the at least one bolt). In another embodiment, the strengthening member may be molded into the first casing part.

In one embodiment, the first and second casing parts have interengaging profiles for aligning the casing parts. For example, one of the first and second casing parts may have a peripheral flange configured to engage a corresponding peripheral recess on the other casing part. In this way, the first and second casing parts may be accurately aligned (e.g., along or normal to a longitudinal axis of the pipe) to ensure that the flow control device (and cutting surface) is correctly registered with the housing in order to reduce the risk of the cutting surface cutting into the housing and preventing correct installation of the flow control device. In one embodiment, the first and second casing parts together define a pair of opposed peripheral flanges (e.g., longitudinally opposed alignment skirts).

In one embodiment, the first and second casing parts together define a pair of longitudinally spaced gasket cavities for receiving gaskets for sealing opposed ends of the housing when installed around the pipe. In one embodiment, each of the gasket cavities has a substantially annular profile.

In one embodiment, each of the first and second casing parts comprises a pair of longitudinally spaced gasket cavities, each housing a respective gasket part. For example, each of the first and second casing parts may comprise a pair of longitudinally spaced semi-annular gaskets, each housing a respective semi-annular gasket part.

In one embodiment, each of the pair of gasket parts of the first casing part are configured to abut a respective one of the pair of gasket parts of the second casing part at or near a point where the first and second casing parts meet. In one embodiment, each of the pair of gasket parts of the first casing part and each of the pair of gasket parts of the second casing part have corresponding abutment faces for forming a seal around the pipe when the first and second casing parts are connected. In one embodiment, the corresponding abutment faces are angled. Advantageously, the use of angled abutment faces provides a seal resistant to internal system pressure since, unlike a flat mating surface that would tend to open under pressure, the angled form will tend to maintain a closed state under pressure.

In one embodiment, the first casing part further comprises a pair of planar gasket parts extending along opposed sides of the chamber between the longitudinally spaced pair of gasket parts of the first casing part. In one embodiment, the pair of planar gasket parts each include a portion extending into the chamber for cutting by the cutting surface during installation of the flow control device. Advantageously, providing planar gasket parts overlapping into the chamber avoids the need to pre-size and align planar gasket parts with sealing faces of the flow control device.

In one embodiment, the pair of planar gasket parts and the pair of gasket parts of the first casing part are provided as a single (integral) gasket (e.g., a one-piece molding).

The chamber may be elongate. In one embodiment, the chamber is substantially cylindrical. For example, the chamber may be configured to be a fluid-tight fit around the section of the pipe.

In one embodiment, the apparatus further comprises a visual indicator for indicating when the flow control device is correctly inserted in the installed position. In one embodiment, the visual indicator comprises an indicator washer (e.g., positioned to be visible only once the flow control device is correctly inserted in the installed position).

In another embodiment, the apparatus may further comprise a pressure indicator configured to test sealing of the casing around the section of pipe before the pipe is cut.

In accordance with a second aspect of the present invention, there is provided a pipe insert for forming a sealed connection across a gap in a pipeline between spaced exposed pipe ends, comprising a housing for conveying fluid between spaced exposed pipe ends, the housing including: a first part having a first end for sealably engaging a first exposed pipe end; and a second part having a second end for sealably engaging a second exposed pipe end spaced from the first exposed pipe end, the first and second parts being configurable to vary the relative spacing between the first and second ends between a retracted configuration to allow the apparatus to be positioned in a gap in a pipeline and an extended configuration for forming a sealed connection between spaced exposed pipe ends; wherein the first and second parts are biased to be in the extended configuration.

In this way, an improved pipe insert is provided that is self-sealing once positioned between spaced exposed ends of a pipeline. Advantageously, such a pipe insert may significantly simplify installation into pipes filled with fluid since it is not necessary to attempt to attach fixings (e.g., slidable flanges) to the exposed pipe ends through a sealed housing enclosing the pipeline.

In one embodiment, the first and second parts are biased in the extended configuration by a resilient element. In one embodiment, the resilient element comprises a spring.

In one embodiment, the first and second parts are releasably lockable in one or more of the retracted configuration and expanded configuration.

In one embodiment, the first end comprises a first collar for sealably receiving a portion of the first exposed pipe end. In addition, or in another embodiment, the second end comprises a second collar for sealably receiving a portion of the second exposed pipe end.

In one embodiment, the pipe insert further comprises a peripheral gripping surface located on the first end, the peripheral gripping surface being configured to grip a periphery of the first exposed pipe end. For example, in the case of a first end comprising a first collar for sealably receiving a portion of the first exposed pipe end, the peripheral gripping surface may be configured to grip an outer periphery of the first exposed pipe end. The peripheral gripping surface may be configured to ease removal of the pipe insert (e.g., by angling the gripping surface). The peripheral gripping surface may comprise a plurality of discrete gripping elements. In one embodiment, the peripheral gripping surface comprises a gripping ring. In addition, or in another embodiment, the pipe insert further comprises a peripheral gripping surface located on the second end, the peripheral gripping surface being configured to grip a periphery of the second exposed pipe end. For example, in the case of a second end comprising a second collar for sealably receiving a portion of the second exposed pipe end, the peripheral gripping surface may be configured to grip an outer periphery of the second exposed pipe end. The peripheral gripping surface may be configured to ease removal of the pipe insert (e.g., by angling the gripping surface). The peripheral gripping surface may comprise a plurality of discrete gripping elements. In one embodiment, the peripheral gripping surface comprises a gripping ring.

In one embodiment, the first and second parts have interengageable profiles. For example, the second part may be configured to receive (e.g., slidably receive) the first part, whereby the first and second parts are configurable between the retracted and extended configurations by relative movement between the first and second parts.

In one embodiment, the pipe insert comprises a valve for controlling flow of fluid through the housing, the valve being configurable between an open configuration for permitting flow through the housing and a closed configuration for substantially preventing flow through the housing. The valve may be controlled by means of an actuator (e.g., a rotary actuator) extending through the housing. In one embodiment, the valve comprises a rotatable ball valve. In that the first and second parts have interengageable profiles and the second part is configured to receive (e.g., slidably receive) the first part, the valve may be housed in the second part.

In accordance with a third aspect of the present invention, there is provided a kit of parts for installing a pipe insert into a pipeline, comprising: an installation housing configured to enclose a portion of a pipe, the installation housing comprising: a chamber configured to receive the portion of the pipe; and a passageway extending from the chamber; a pipe cutter for cutting a section from the portion of pipe received in the chamber, whereby the cut section of pipe once removed leaves a gap between a first exposed end of the pipe and a second exposed end of the pipe spaced from the first exposed end; a pipe insert for forming a sealed connection in the gap between the spaced first and second exposed ends of the pipe once the section of pipe has been removed, the pipe insert being initially stowed in the passageway; and an exchange mechanism for withdrawing the section of pipe cut by the pipe cutter from the chamber and inserting the pipe insert into the chamber between the spaced first and second exposed ends of the pipe for installation therebetween.

In one embodiment, the pipe insert comprises a housing for conveying fluid between the spaced exposed ends of the pipe, the housing including: a first part having a first end for sealably engaging the first exposed end of the pipe; and a second part having a second end for sealably engaging the second exposed end of the pipe spaced from the first exposed end, the first and second parts being configurable to vary the relative spacing between the first and second ends between a retracted configuration to allow the apparatus to be positioned in the gap in the pipe and an extended configuration for forming a sealed connection between the first and second exposed ends of the pipe; and the first and second parts are biased to be in the extended configuration.

Advantageously, the use of a self-sealing pipe insert means that no further fitting is required after the installation housing is removed, thereby speeding up installation and making the use of pipe inserts of relatively small dimensions possible. Furthermore, the use of the self-sealing pipe insert may significantly reduce the number of components required to couple the pipe insert to the pipe.

In one embodiment, the installation housing is configured to sealably enclose the portion of the pipe. In this way, the installation housing may be used to install the pipe insert when the pipe is filled with fluid.

In one embodiment, the first and second parts are biased in the extended configuration by a resilient element. In one embodiment, the resilient element comprises a spring.

In one embodiment, the first and second parts are releasably lockable in one or more of the retracted configuration and expanded configuration.

In one embodiment, the first end comprises a first collar for sealably receiving a portion of the first exposed end of the pipe.

In one embodiment, the second end comprises a second collar for sealably receiving a portion of the second exposed end of the pipe.

In one embodiment, the pipe insert further comprises a peripheral gripping surface located on the first end, the peripheral gripping surface being configured to grip a periphery of the first exposed end of the pipe. For example, in the case of a first end comprising a first collar for sealably receiving a portion of the first exposed end of the pipe, the peripheral gripping surface may be configured to grip an outer periphery of the first exposed end of the pipe. The peripheral gripping surface may be configured to ease removal of the pipe insert (e.g., by angling the gripping surface). The peripheral gripping surface may comprise a plurality of discrete gripping elements. In one embodiment, the peripheral gripping surface comprises a gripping ring. In addition, or in another embodiment, the pipe insert comprises a peripheral gripping surface located on the second end, the peripheral gripping surface being configured to grip a periphery of the second exposed end of the pipe. For example, in the case of a second end comprising a second collar for sealably receiving a portion of the second exposed end of the pipe, the peripheral gripping surface may be configured to grip an outer periphery of the second exposed end of the pipe. The peripheral gripping surface may be configured to ease removal of the pipe insert (e.g., by angling the gripping surface). The peripheral gripping surface may comprise a plurality of discrete gripping elements. In one embodiment, the peripheral gripping surface comprises a gripping ring.

In one embodiment, the first and second parts have interengageable profiles. For example, the second part may be configured to receive (e.g., slidably receive) the first part, whereby the first and second parts are configurable between the retracted and extended configurations by relative movement between the first and second parts.

In one embodiment, the pipe insert comprises a valve for controlling flow of fluid through the housing, the valve being configurable between an open configuration for permitting flow through the housing and a closed configuration for substantially preventing flow through the housing. The valve may be controlled by means of an actuator (e.g., a rotary actuator) extending through the housing. In one embodiment, the valve comprises a rotatable ball valve. In that the first and second parts have interengageable profiles and the second part is configured to receive (e.g., slidably receive) the first part, the valve may be housed in the second part.

In one embodiment, the pipe cutter comprises a collar configured to enclose a portion of the pipe, the collar including at least one cutting surface for scoring the pipe as the cutting surface rotates relative to the pipe. The exchange mechanism may be configured to withdraw the pipe cutter with the section of pipe cut by the pipe cutter contained within the collar. In one embodiment, the collar is configured to be rotatably mounted around the pipe.

The collar may comprise first and second collar parts having interengageable profiles. For example, the first collar part may have a profile that is configured to slidably engage a corresponding profile of the second collar part (e.g., by means of relative movement between the first and second collar parts along a longitudinal axis of the pipe). In this way, a two-part pipe cutter is provided that is quick to fit, has fewer components and is cheaper to construct than previous pipe cutters.

The collar may comprise a peripheral drive surface for engaging a rotary drive mechanism. The rotary drive mechanism may be disengageable from the peripheral drive surface. In one embodiment, the rotary drive mechanism is further configured to engage and withdraw the rotatable collar from the chamber once the section of pipe has been cut. In this way, the rotary drive mechanism may form part of the exchange mechanism.

In one embodiment, the rotary drive mechanism and rotatable collar include lockable profiles that are engageable by relative movement between the rotary drive mechanism and the rotatable collar. For example, in one embodiment, the rotary drive mechanism comprises a locking element and the rotatable collar is rotatable relative to the locking element between a first orientation in which the locking element can pass through a slot in the rotatable collar and a second orientation in which the locking element cannot pass through the slot in the rotatable collar, the locking element being configured to engage the slot when the rotatable collar is in the first orientation as the rotary drive mechanism moves linearly relative to the rotatable collar. The rotatable collar may be rotated by means of the peripheral drive surface to register the slot with the locking element. The rotary drive mechanism is believed to be more compact and cheaper to manufacture than prior art drive mechanisms.

In one embodiment, the installation housing comprises an end part that is movable relative to a main part of the installation housing between a first configuration in which the installation housing can receive the portion of the pipe and a second configuration in which the installation housing is configured to enclose the portion of the pipe. In one embodiment, the installation housing further comprises at least one locking member for locking the end part in the second configuration. In one embodiment, the end part and main part of the installation housing form first and second parts, respectively, of a shaft and the locking member comprises a rotatable locking member for engaging the shaft, the rotatable locking member being movable between an unlocked position allowing separation of the first and second parts of the shaft and a locked position preventing separation of the first and second parts of the shaft. For example, the locking member may comprise a substantially "c"-shaped rotatable locking member. In this way, the end part and main part may be quickly lockably coupled together. In one example, the substantially "c"-shaped locking member may be coupled to the first part of the shaft when in the unlocked position.

In one embodiment, the passageway defines an exchange space for first receiving the cut section of pipe (e.g., in combination with the pipe cutter) during withdrawal of the section of pipe by the exchange mechanism and for subsequently receiving the pipe insert during insertion of the pipe insert into the chamber by the exchange mechanism. The installation housing may comprise a further passageway configured to receive the cut section of pipe (e.g., in combination with the pipe cutter) from the chamber. In one embodiment, the further passageway extends from the exchange space.

In an alternative embodiment, the further passageway extends from the chamber. In one embodiment, the further passageway extends in a common plane to the first-defined passageway and is angularly spaced therefrom. In one embodiment, the further passageway and first-defined passageways have an angular spacing of less than 90 degrees. For example, the further passageway and first-defined passageways may have an angular spacing of substantially 45 degrees. The further passageway and first-defined passageways may partially overlap as they extend to meet the chamber.

In one embodiment, the exchange mechanism comprises a first movable casing part configured to move relative to the main part of the housing to retract the cut section of pipe from the chamber. In one embodiment, the first casing part is configured to retract the pipe cutter with the cut section of pipe housed therein from the chamber. In one embodiment, the first casing part houses the rotary drive mechanism. In another embodiment, the first movable casing part is configured to insert the pipe insert into the chamber once the pipe insert is received in the exchange space.

The exchange mechanism may further comprise a second movable casing part configured to move relative to a main part of the housing to insert the pipe insert into the chamber. In one embodiment, the second movable casing part is configured to releasably engage the pipe insert. In one embodiment, the second movable casing part is configured to orientate the pipe insert into a predetermined position as the pipe insert is inserted into the chamber. For example, the second movable casing part may comprise a movement member configured to rotate the pipe insert.

In one embodiment, the first and second movable casing parts are linked such that as one of the movable casing parts moves, the other moves in an opposite sense to maintain a constant volume in the installation housing. In this way, the force required to operate the first and second movable casing parts may be minimized. For example, the first and second movable casing parts may be linked such that insertion of the first movable casing part causes the second movable casing part to retract (e.g., at a corresponding rate).

In one embodiment, the exchange mechanism may comprise at least one rod for inserting the pipe insert into the chamber. Advantageously, the use of one or more rods having a smaller cross-sectional area than either the first or second movable casing parts may reduce the force on the exchange mechanism from internal pressure.

In one embodiment, the kit of parts includes an indicator mechanism for indicating when the section of pipe has been cut through by the pipe cutter. The indicator mechanism may comprise an indicator visible from outside of the installation housing. The indicator may indicate that the section of pipe has been cut through by the pipe cutter by a change in position or orientation (e.g., in response to movement of the pipe cutter).

BRIEF DESCRIPTION OF THE DRAWINGS

An embodiment of the present invention will now be described by way of example with reference to the accompanying drawings, in which.

DETAILED DESCRIPTION OF THE INVENTION

Figure 1:
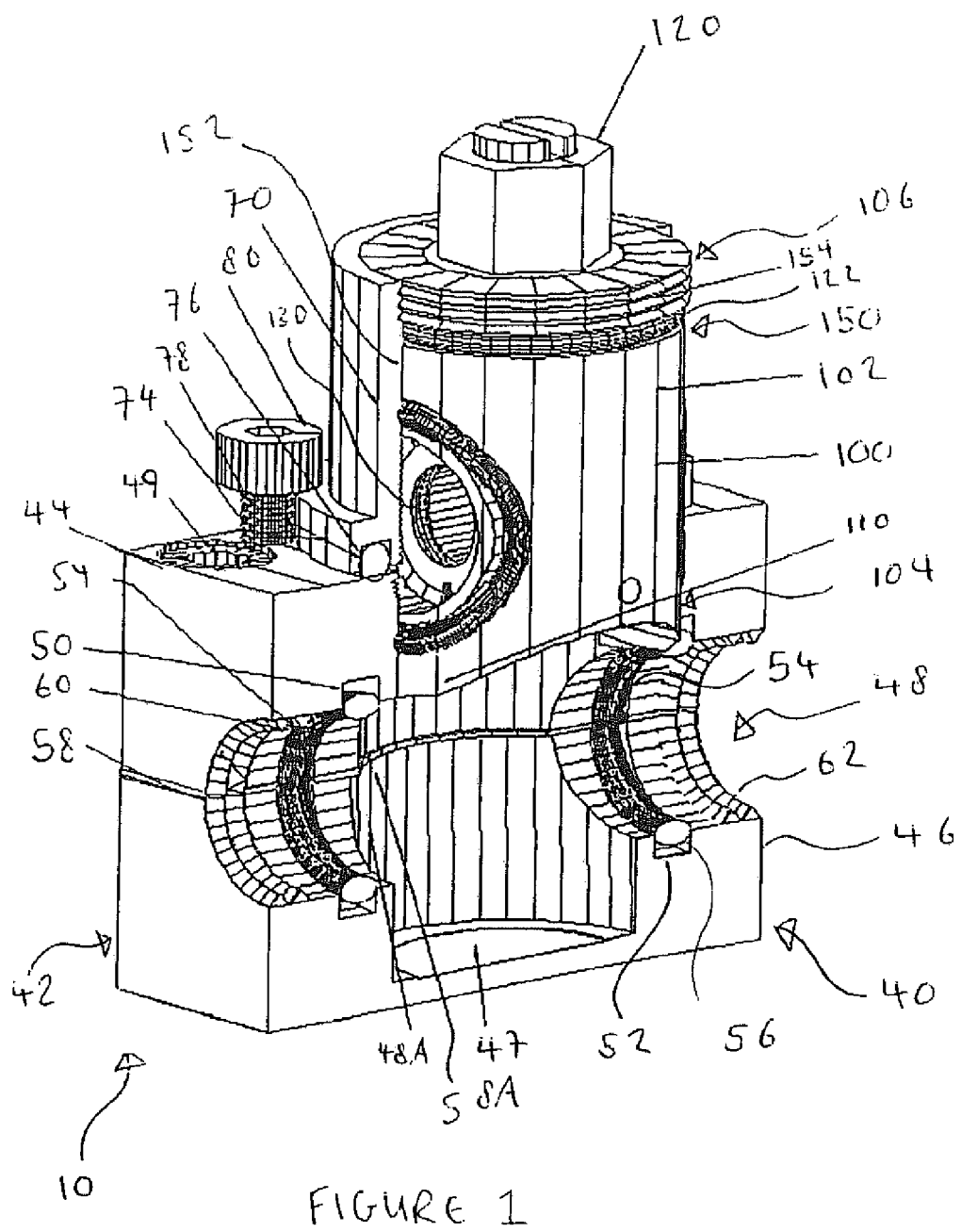
FIG. 1 is a schematic perspective view of an apparatus comprising a housing and flow control device in accordance with a first embodiment of the present invention with the housing shown in cross-section and the flow control device in a stowed position.

FIGS. 1-4 show isolation apparatus 10 for controlling flow of fluid through a pipe 20, comprising housing 40, a flow control device 100 and a rotary drive mechanism 150.

Housing 40 comprises a casing 42 comprising an upper casing part 44 and lower casing part 46 configured to be clamped together by means of bolts 49 to enclose a portion 22 of pipe 20. Upper and lower casing parts 44, 46 together define an elongate cylindrical chamber 48 configured to receive the portion 22 of the pipe 20, together with first and second annular gasket cavities 50, 52 for receiving upper and lower gaskets 54, 56 for sealing, in combination with a planar gasket 58 forming part of upper casing 44, opposed ends of the chamber 48 when the housing 40 is installed around pipe 20. Chamber 48 defines a central cutter cavity 48A for receiving flow control device 100. Upper casing part 44 further defines a cylindrical passageway 45 extending from chamber 48 to an opening 47A on an upper surface of the upper casing part 44. Lower casing part 46 further defines a cylindrical compartment 47 extending from chamber 48 and registered with passageway 45. Upper and lower casing parts 44, 46 additionally define gripper ring parts 60, 62 for preventing relative movement between the housing 40 and the pipe 20 after installation.

Housing 40 further includes a separable collar 70 extending from an upper surface of upper casing part 44 and defining a cylindrical stowage space 72 adjacent chamber 48 for housing flow control device 100 when in an uninstalled position (as shown in FIG. 1). Collar 70 includes a peripheral flange 74 defining an annular gasket cavity 76 housing a collar gasket 78 for sealing the collar 70 against the upper surface of upper casing part 44. Retaining screws 80 are provided to lock collar 70 to the upper casing part 44.

Flow control device 100 comprises a substantially cylindrical body 102 having a leading end 104 and a trailing end 106. Leading end 104 defines a cutting surface 110 having a pair of circumferentially spaced curved blades 112 forming a scalloped profile 114 and defines a compression surface 116. The trailing end 106 includes a hexagonal drive interface 120 for rotating the flow control device 100 and an O-ring seal 122 for preventing passage of fluid past the trailing end 106.

Flow control device 100 comprises an open bore 130 extending through the body 102 configured to register with pipe 20. O-ring seals 132, 134 are provided on opposed lateral sides of the body 102 for forming a sealed passageway between opposed ends of the pipe 20 and the open bore 130. The flow control device further comprises a valve mechanism 140 housed in the body 102 comprising a rotatable ball valve 142 configurable between a first configuration for allowing fluid to pass through open bore 130 and a second configuration for substantially preventing fluid from passing through the open bore 130 in response to a 90 degree rotary input. Valve mechanism 140 further comprises a rotary actuator spindle 144 extending through the body 102 for controlling the rotatable ball valve 142 and having a rotary interface 146 located at the trailing end 106.

Rotary drive mechanism 150 comprises a pair of interengaging screw-threaded portions 152, 154. Screw-threaded portion 152 extends along an inner surface of collar 70 and along an upper inner surface of passageway 45 in the upper casing 44. Collar 70 may include crenulations, or notches, around a periphery of flange 74 to accommodate retaining screws 80 and prevent collar rotation. The use of such crenulations assists alignment of threads extending along the inner surface of collar 70 and upper casing 44. When screw-threaded portion 154 passes through collar 70 and engages with the thread extending along the inner surface of collar 70, the retaining screws 80 may be released and provide for separation of collar 70 from upper casing 44. This separation is necessary to provide for alignment of collar/housing threads, but must not allow collar 70 to rotate (or leak fluid). The crenulations allow release of friction on collar 70 but prevent collar 70 from rotating. Screw-threaded portion 154 extends along the trailing end 106 of body 102 between gasket 122 and hexagonal drive interface 120.

Figure 2:
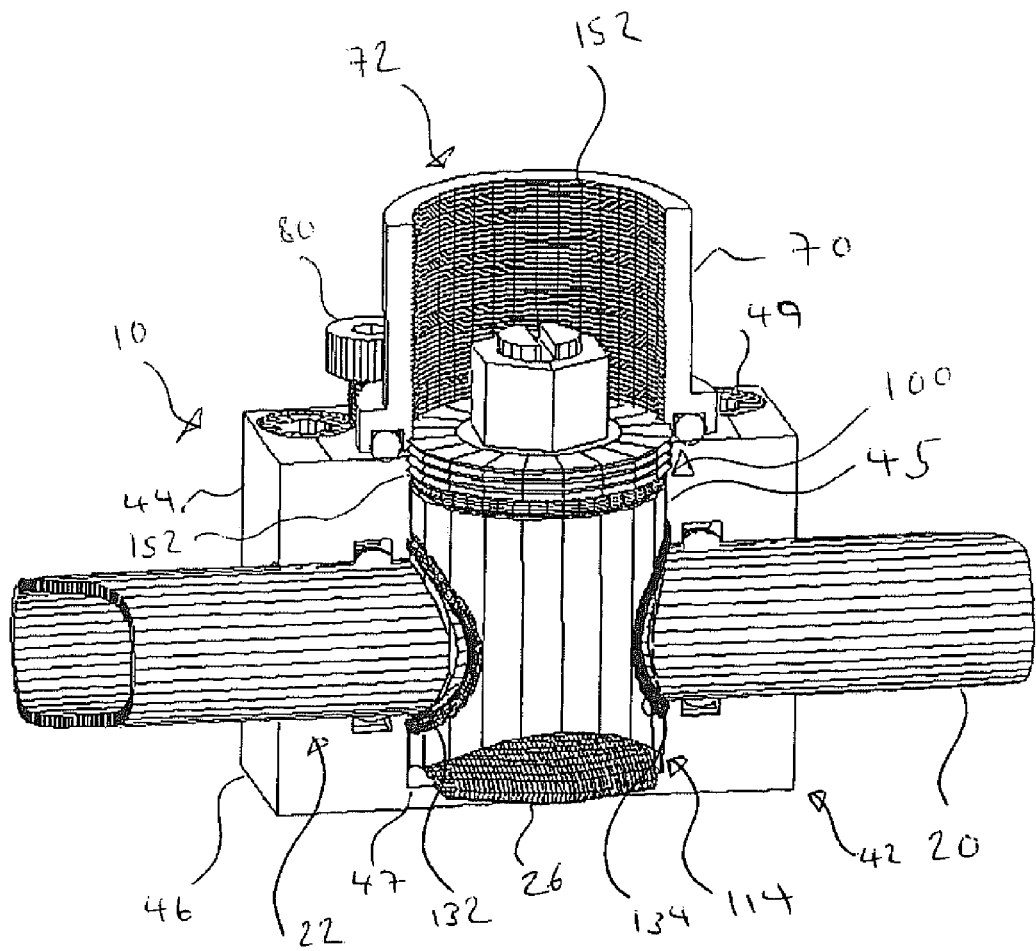
FIG. 2 is a schematic perspective view of the apparatus of FIG. 1 installed into a portion of a pipe with the flow control device in an installed position and the housing shown in cross-section.
Figure 3:
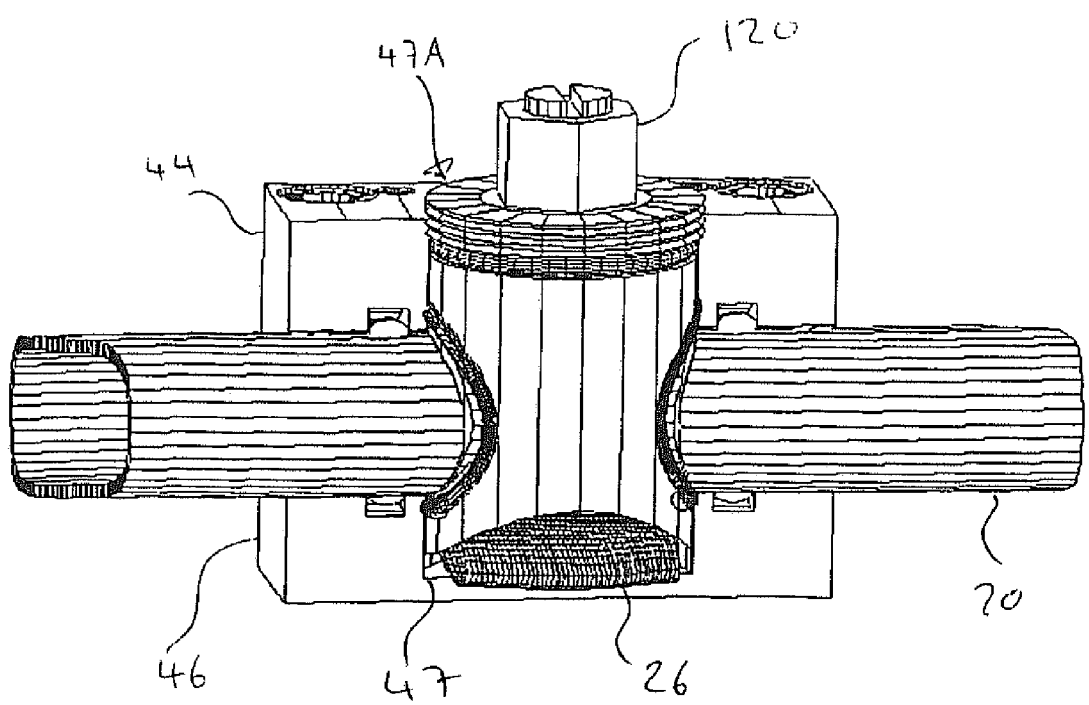
FIG. 3 is a schematic perspective view of the apparatus of FIG. 1 with the collar of the housing removed after installation.
Figure 4:
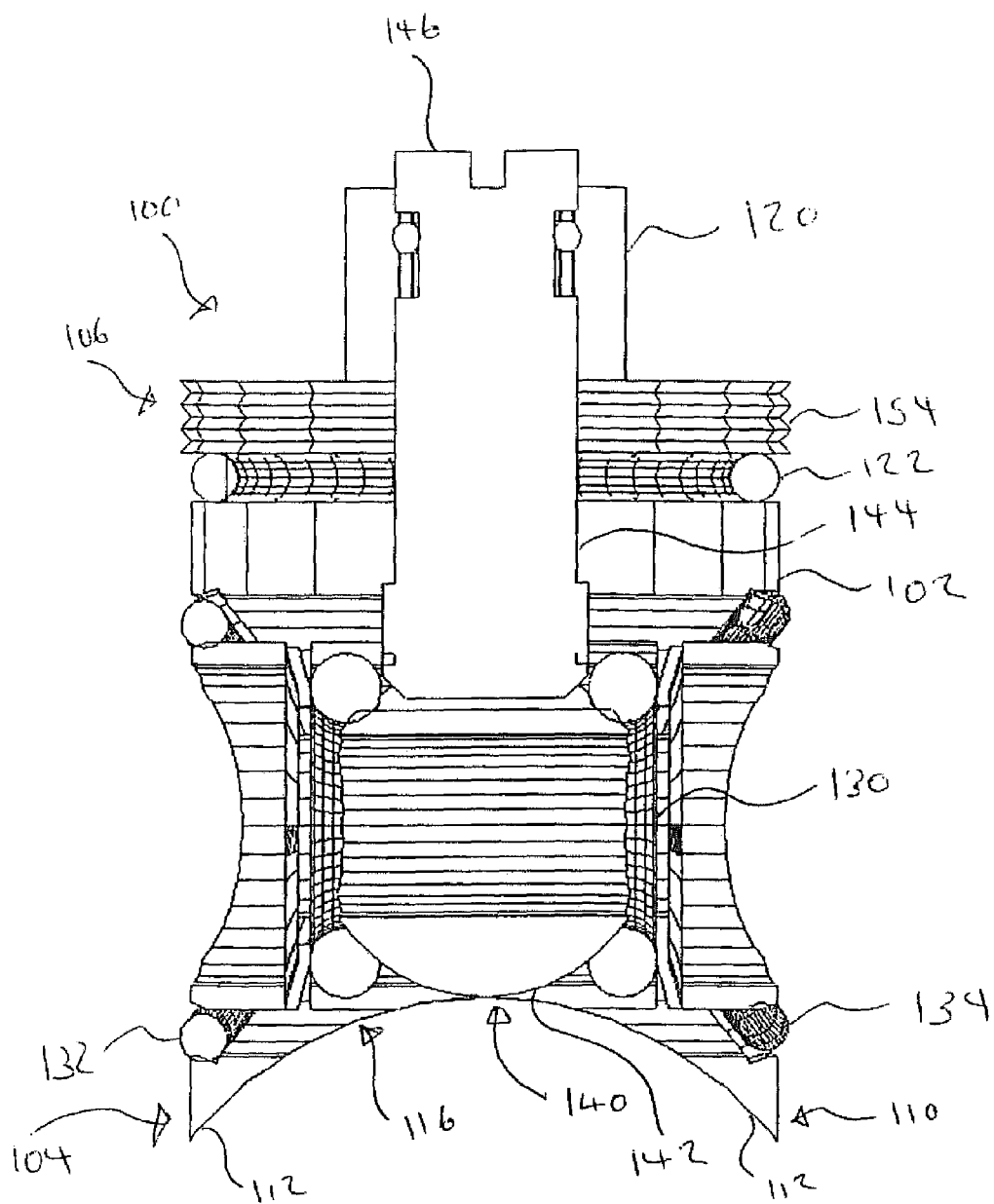
FIG. 4 is a cross-sectional view of the flow control device of FIG. 1.

In use, isolation apparatus 10 is fitted to a portion 22 of pipe 20 by attaching upper and lower casing parts 44, 46 around the portion 22 and clamping the upper and lower casing parts 44, 46 together. Once casing 42 is positioned around pipe 20, collar 70 housing flow control device 100 is connected to upper casing part 44 by means of retaining screws 80. Once collar 70 is connected to casing 42, flow control device 100 is deployed by rotating hexagonal drive interface 120 (e.g., using an appropriate manually operated lever device or battery-operated drill insertion device for engaging hexagonal drive interface 120). In response, a rotary input rotary drive mechanism 150 causes flow control device 100 to rotate and move linearly downward from the stowed position in the collar 70 toward an installed position (as shown in FIGS. 2 and 3) in chamber 48.

As the rotating leading end 104 engages pipe 20, cutting surface 110 cuts through the pipe 20 to remove a section 26 of pipe 20 and form a gap in the pipe 20 into which the body 102 of the flow control device 100 is sealably inserted once in the installed position. In addition, cutting surface 110 will act to form a circular profile in planar gasket 58, which includes a portion 58A extending into cutter cavity 48A. Advantageously, providing a planar gasket 58 overlapping into the cutter cavity 48A avoids the need to pre-size and align planar gasket 58 with the curved sealing face that will be met by the opposed O-ring seals 132, 134.

While cutting surface 110 cuts into the pipe 20, compression surface 116 acts to compress the cut upper part of the pipe section 26 in order to compress the pipe section 26 in order to allow it to fit in cylindrical compartment 47 in lower casing part 46, the cylindrical compartment 47 having a depth that is approximately 60% of the diameter of pipe 20. Once pipe section 26 is severed from the pipe 20, the flow control device moves into the installed position with the leading end 104 and compressed pipe section 26 being moved into compartment 47 out of the way of chamber 48.

Once the flow control device 100 is in the installed position, the rotatable ball valve 142 is movable between its open and closed configurations by turning rotary interface 146 through 90 degrees.

Figure 5:
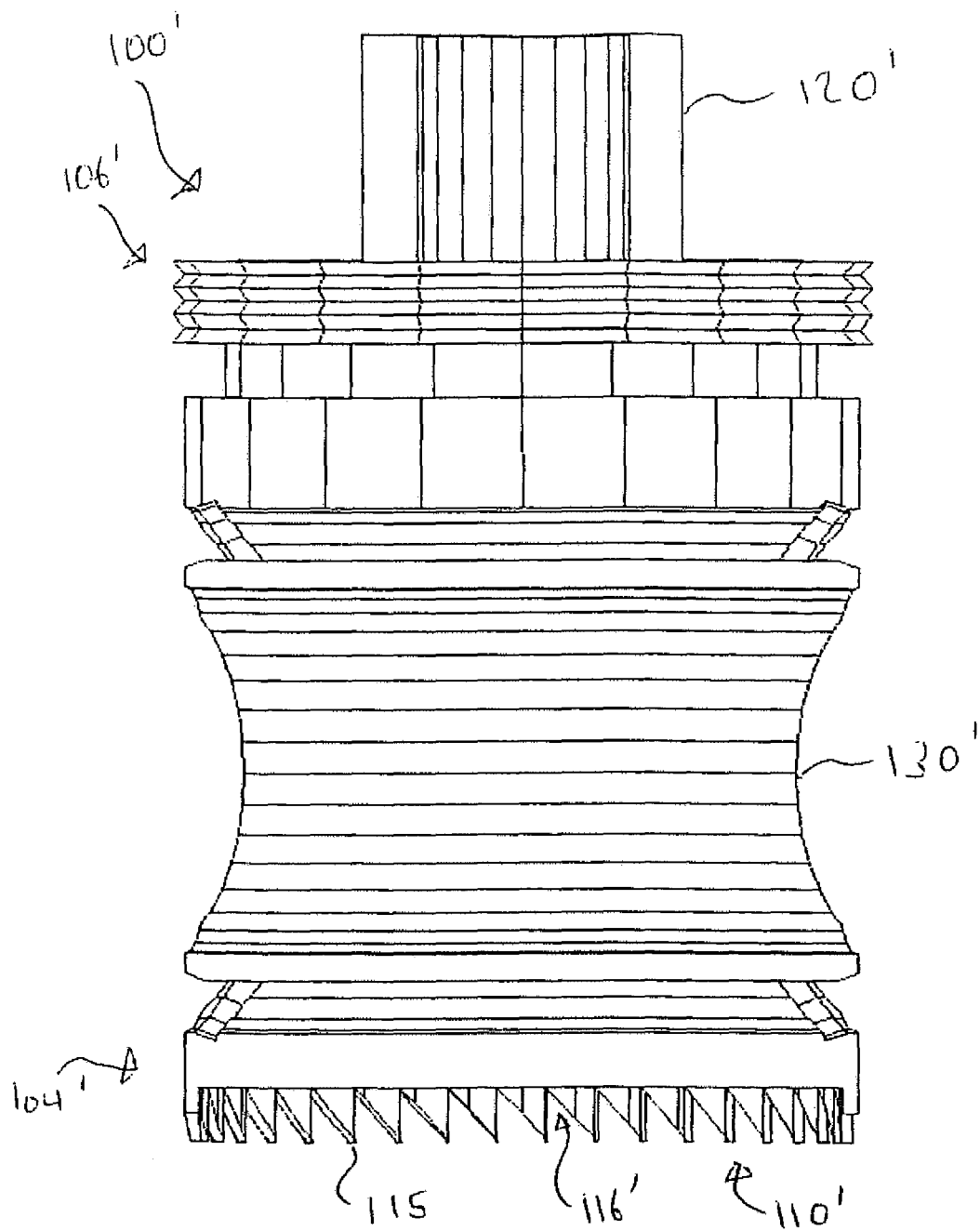
FIG. 5 is a schematic side view of an alternative flow control device according to the present invention for use with the housing of FIG. 1.

FIG. 5 shows an alternative flow control device 100' for use with housing 40 having a leading end 104' defining a cutting surface 110' comprising a circumferential array of cutting teeth 115 and a compression surface 116'.

Figure 6:
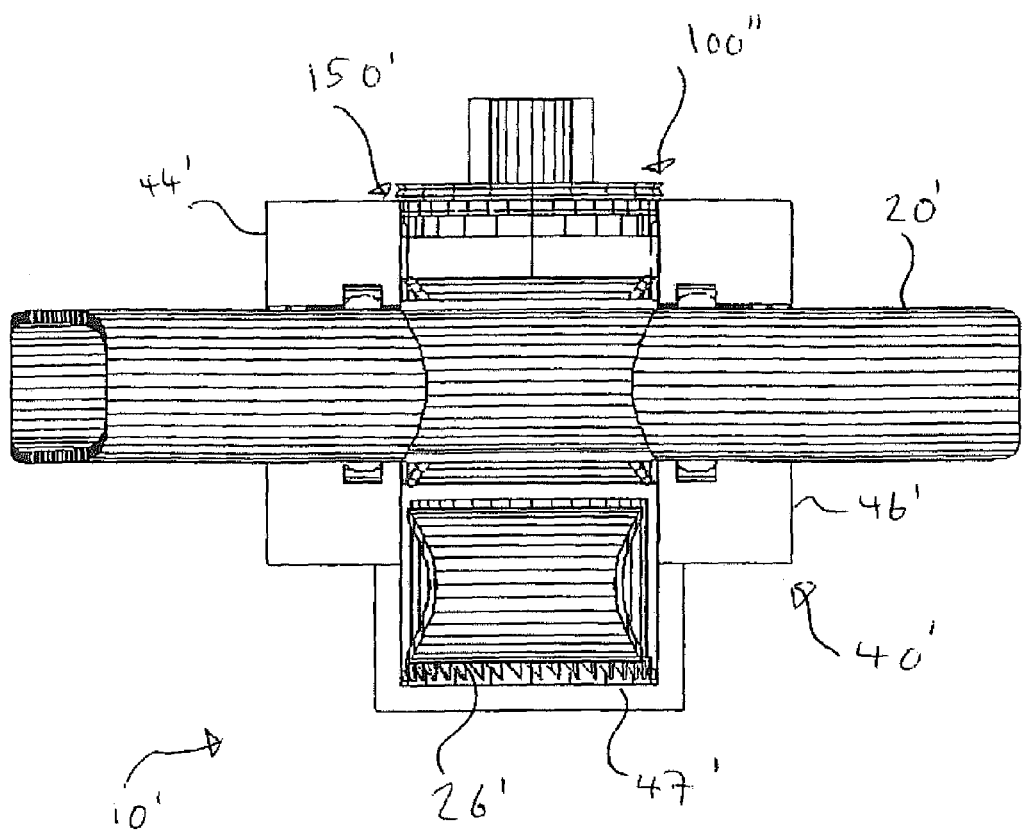
FIG. 6 is a schematic cross-sectional side view of an apparatus in accordance with a second embodiment of the present invention after installation.

FIG. 6 shows isolation apparatus 10' in accordance with a second embodiment of the present invention after installation. Isolation apparatus 10' comprises housing 40', a flow control device 100" and a rotary drive mechanism 150' substantially similar to the isolation apparatus 10 as previously described. However, notably, flow control device 100" does not include a compression surface and accordingly compartment 47' is configured to receive an uncompressed pipe section 26'.

Figure 7:
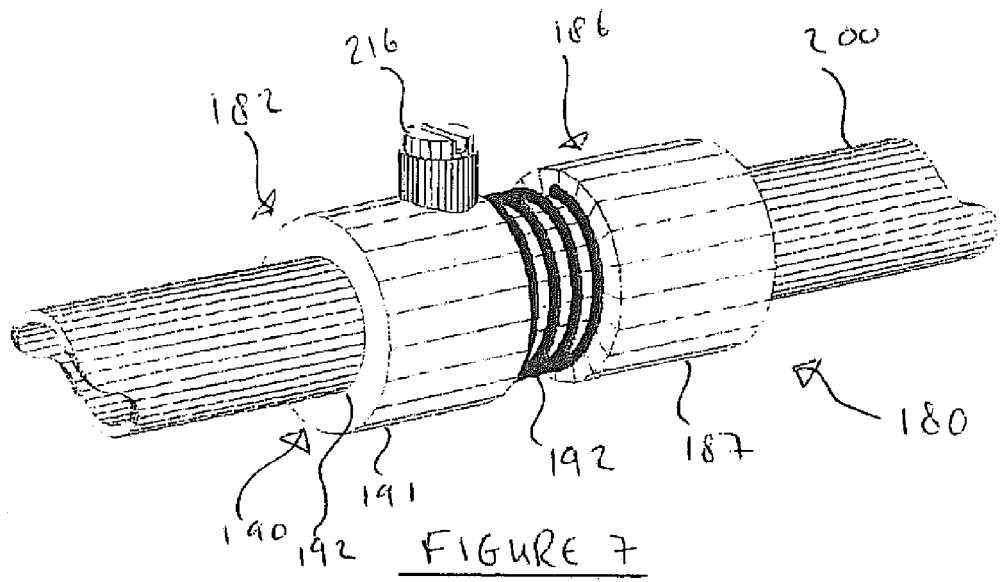
FIG. 7 is a schematic perspective view of a pipe insert according to an embodiment of the present invention installed between exposed ends of a pipe.
Figure 9:
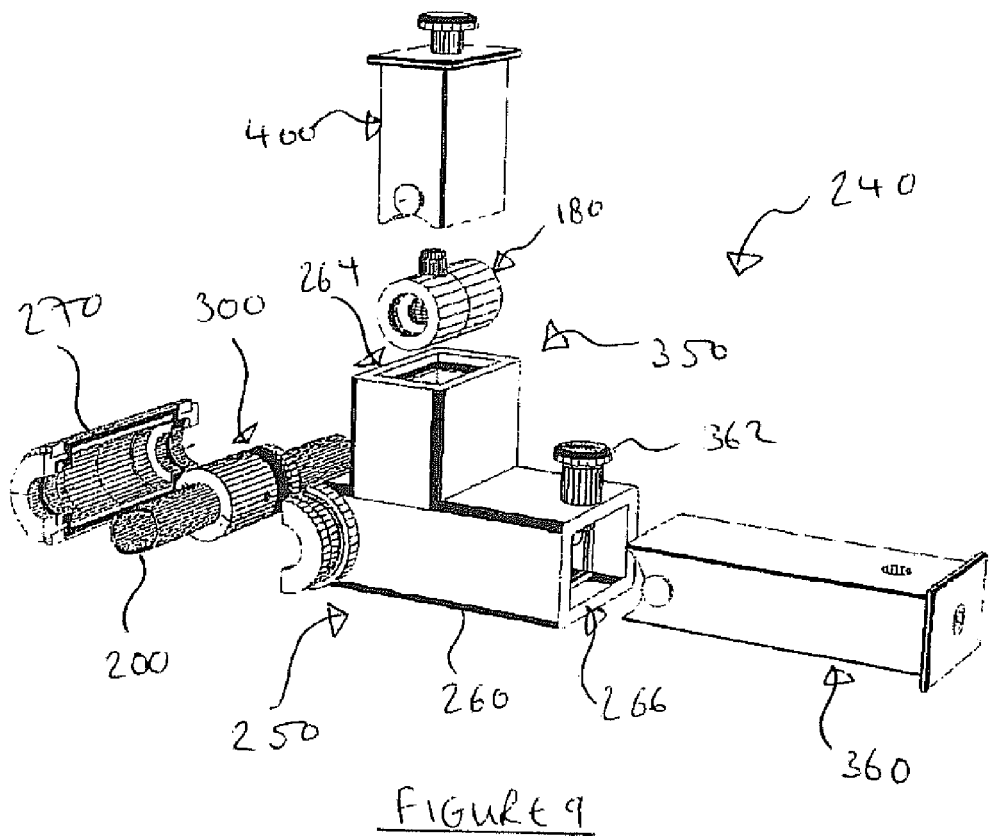
FIG. 9 is an exploded schematic perspective view of a kit of parts in accordance with another embodiment of the present invention for installing the pipe insert of FIG. 7 in a pipe.
Figure 8:
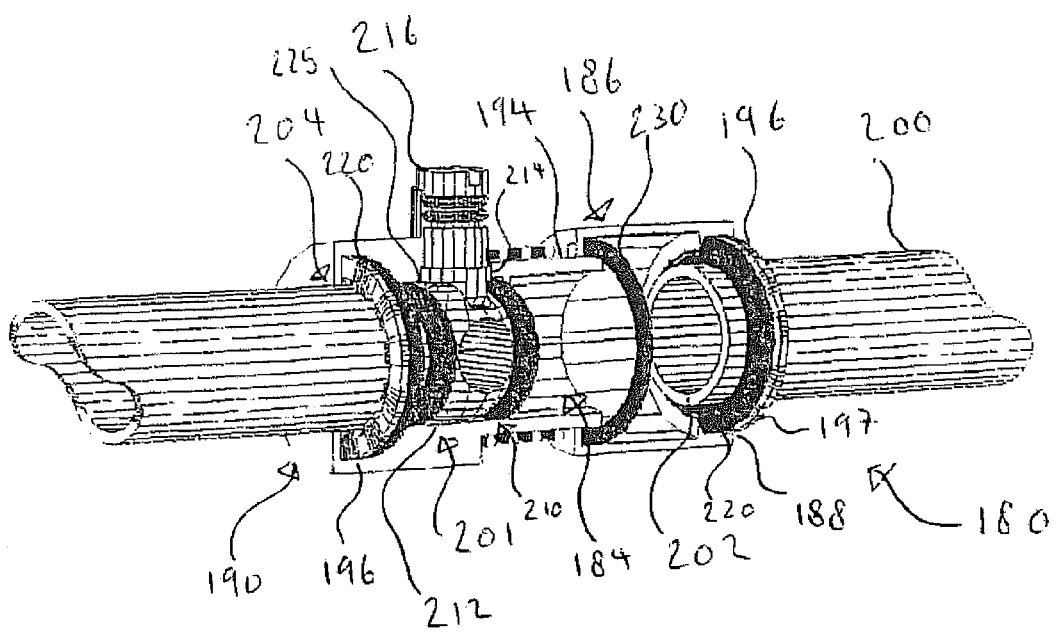
FIG. 8 is a schematic perspective view of the pipe insert of FIG. 7 with part of the housing removed.
Figure 10:
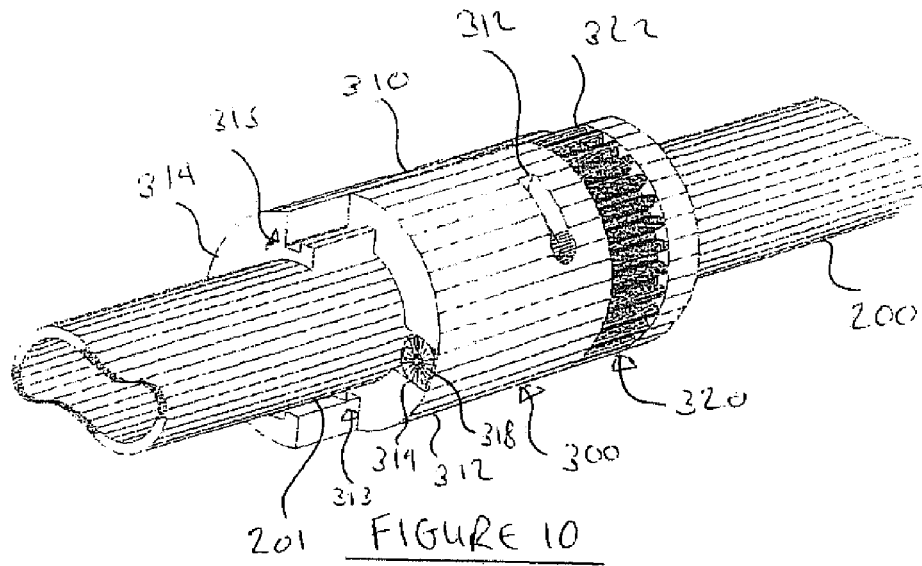
FIG. 10 is a schematic perspective view of a pipe cutter forming part of the kit of parts of FIG. 9.
Figure 11:
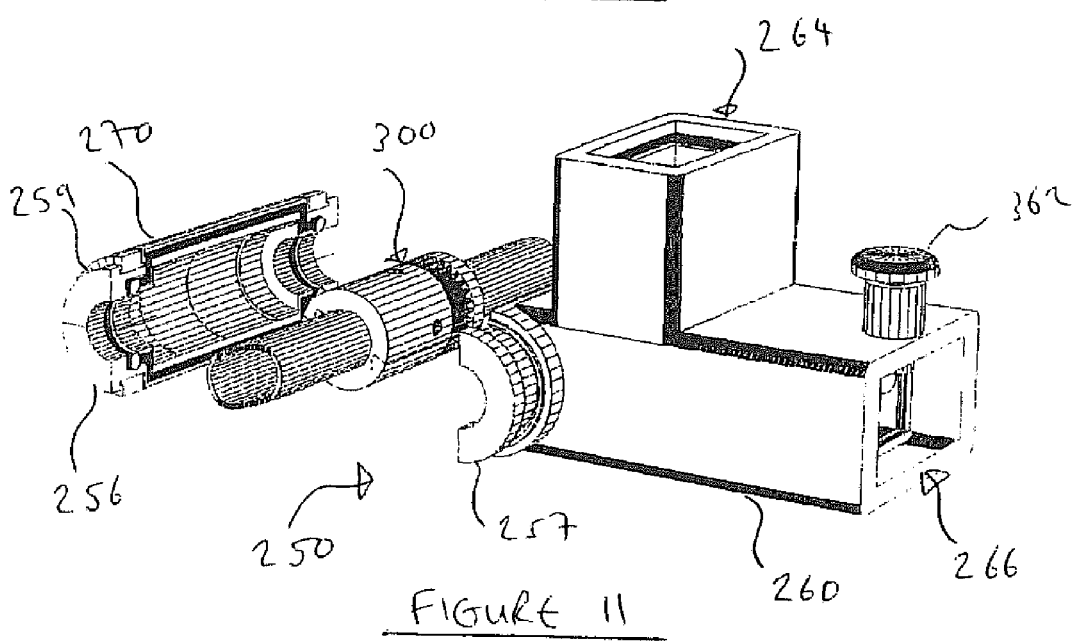
FIG. 11 is a schematic perspective view of components from the kit of parts of FIG. 9 during a first stage of installation.
Figure 12:
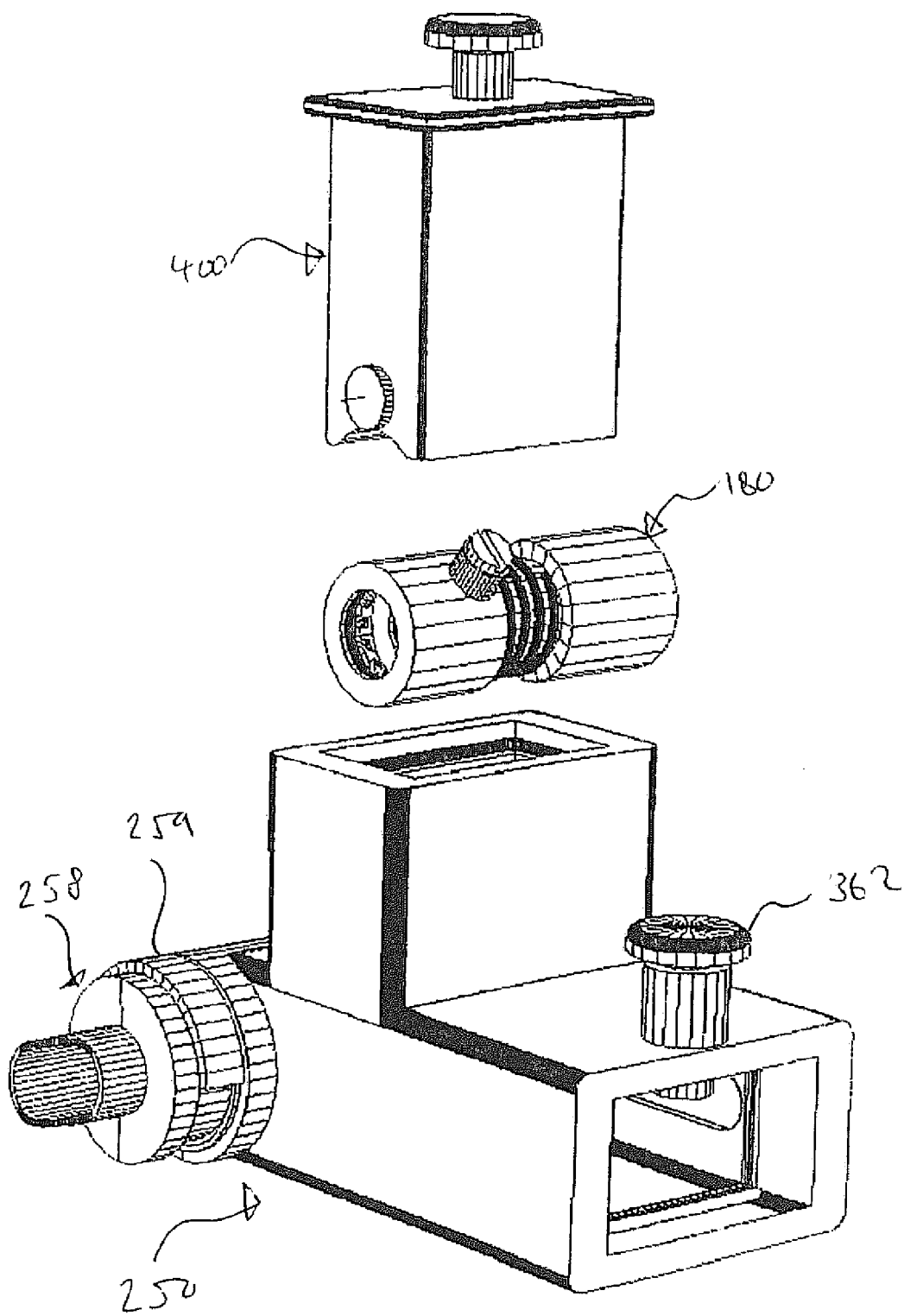
FIG. 12 is a schematic perspective view of components from the kit of parts of FIG. 9 during a second stage of installation.
Figure 13:
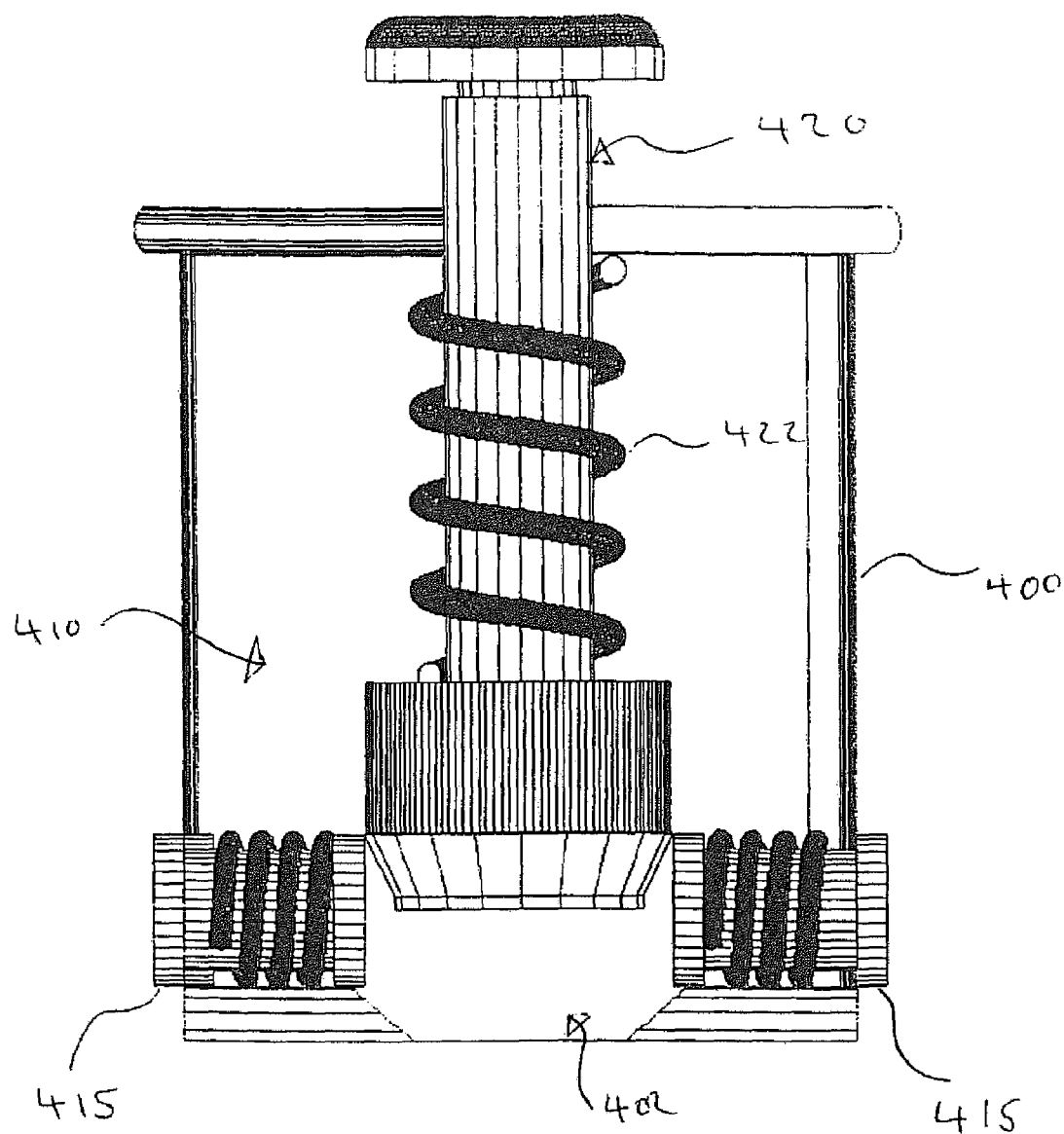
FIG. 13 is a schematic view of a component from the kit of parts of FIG. 9.
Figure 14:
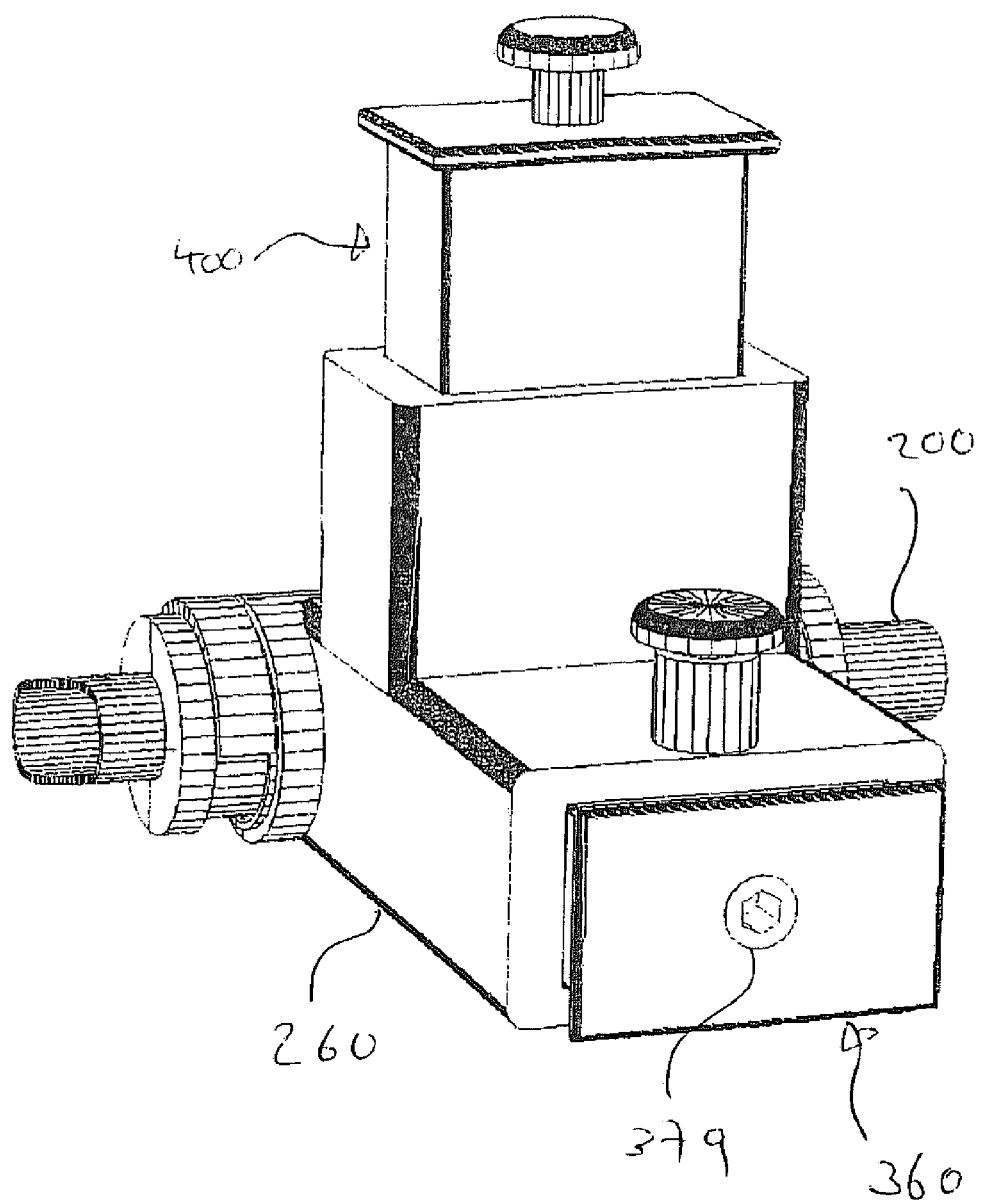
FIG. 14 is a schematic perspective view of components from the kit of parts of FIG. 9 during a third stage of installation.
Figure 15:
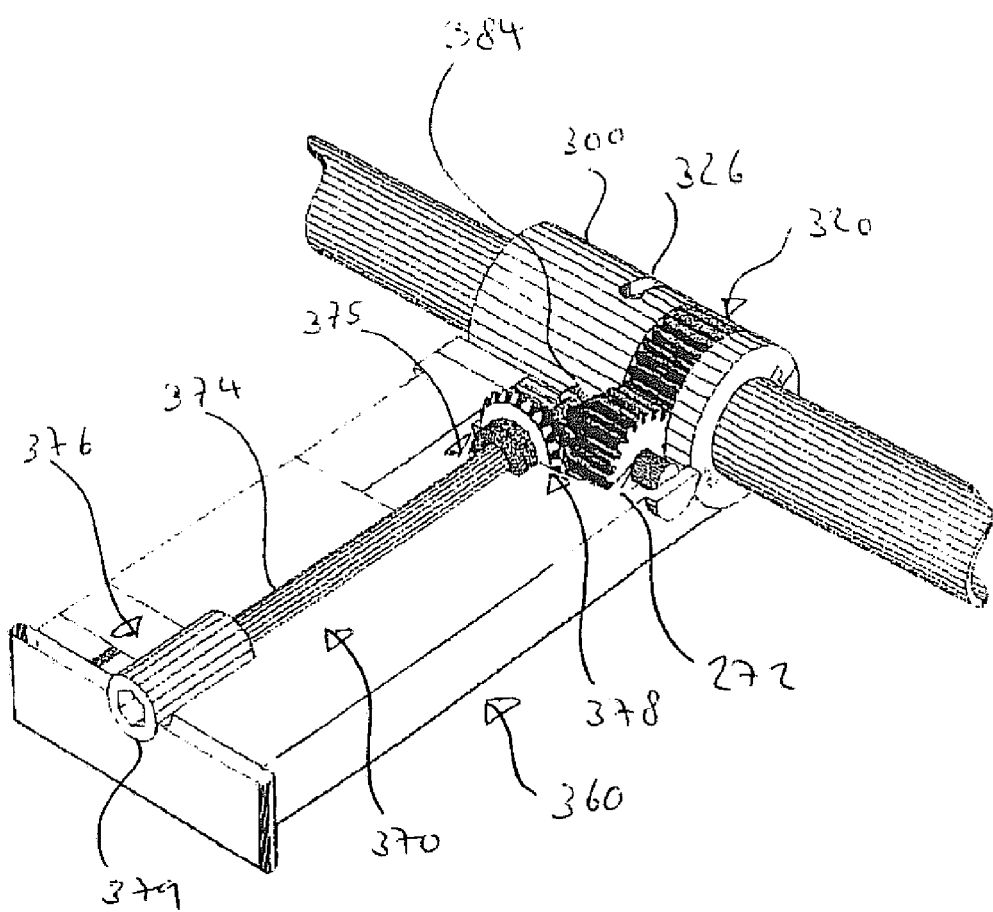
FIG. 15 is a schematic view of another component from the kit of parts of FIG. 9 in an unlocked configuration.
Figure 16:
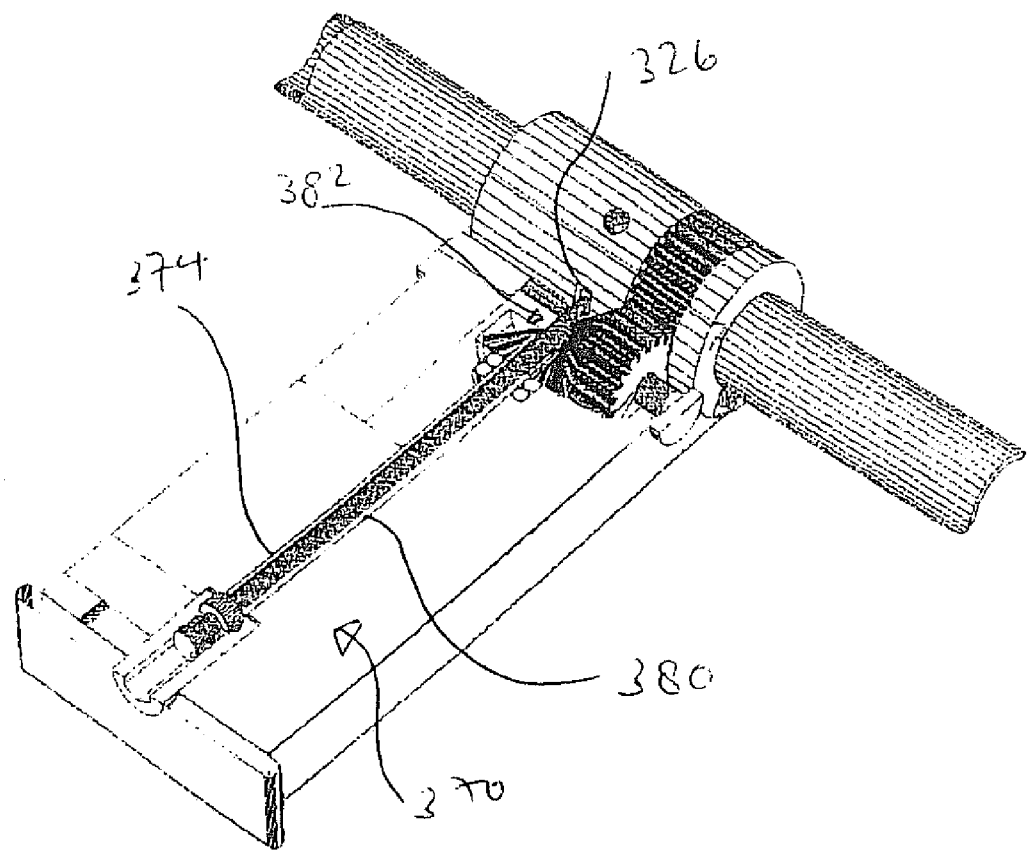
FIG. 16 is a schematic view of another component from the kit of parts of FIG. 9 in a locked configuration.
Figure 17:
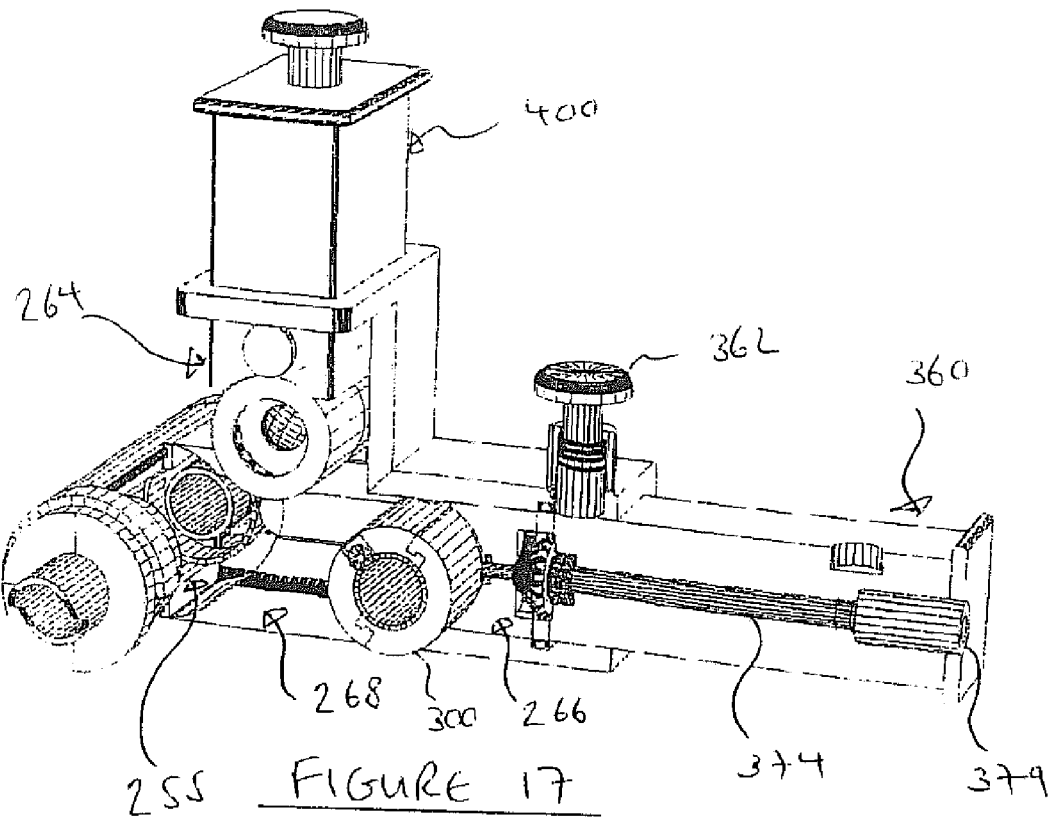
FIG. 17 is a schematic perspective view of components from the kit of parts of FIG. 9 during a fourth stage of installation.
Figure 18:
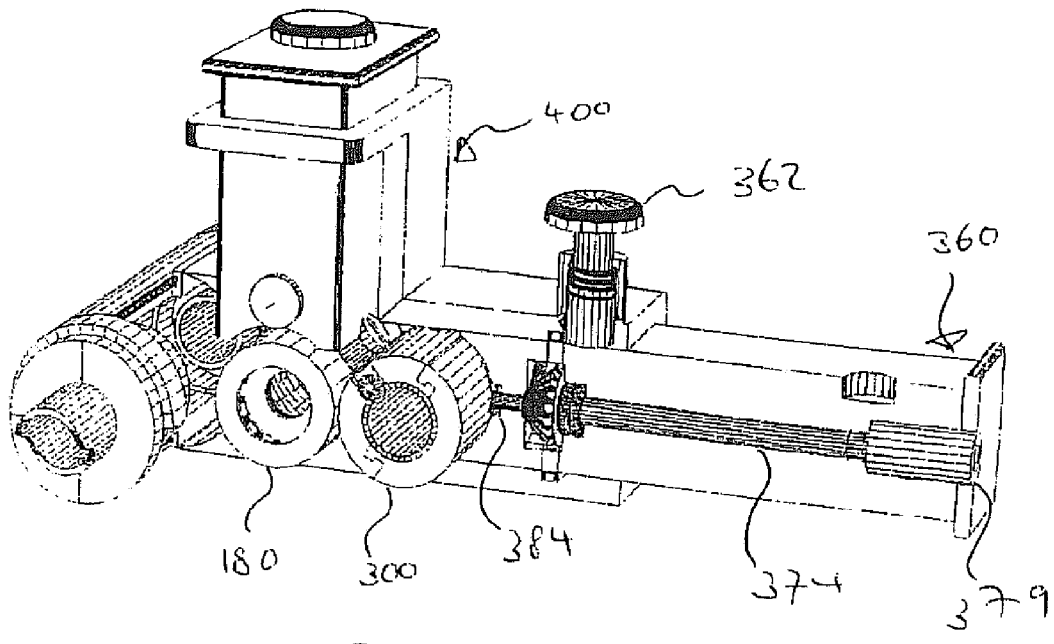
FIG. 18 is a schematic perspective view of components from the kit of parts of FIG. 9 during a fifth stage of installation.
Figure 19:
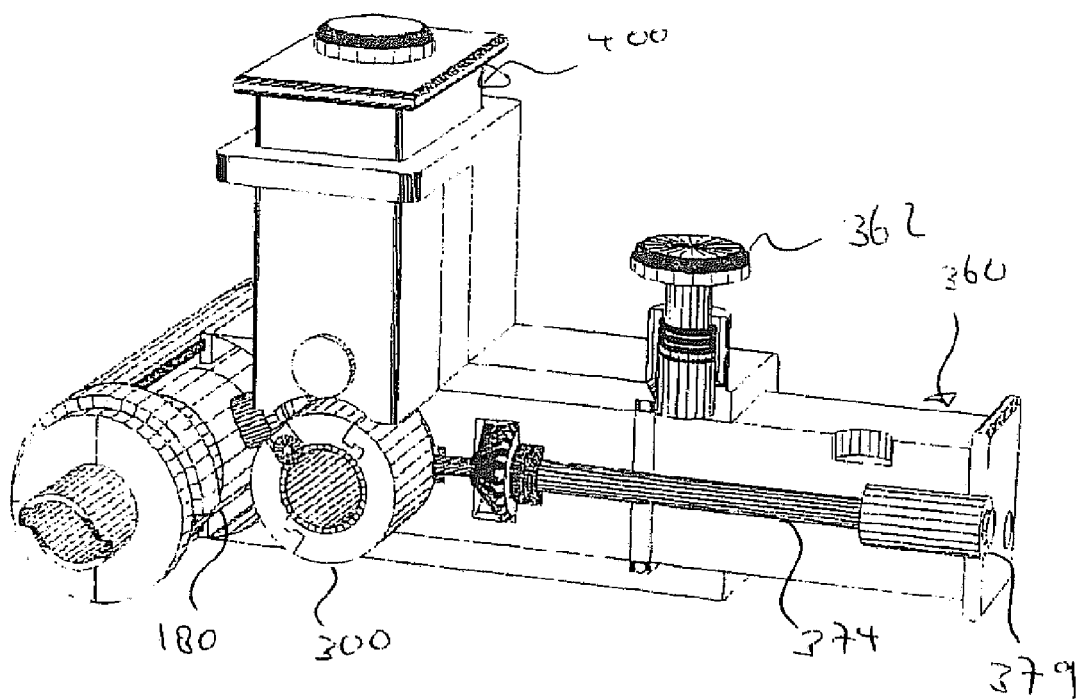
FIG. 19 is a schematic perspective view of components from the kit of parts of FIG. 9 during a sixth stage of installation.

FIGS. 7 and 8 show an isolator valve insert 180 for forming a sealed connection across a gap 201 in a pipeline 200 between a first exposed end 202 of the pipeline 200 and a second exposed end 204 of the pipeline 200 spaced from the first exposed end 202. Isolator valve insert 180 comprises a housing 182 defining a passageway 184 for in use conveying fluid between the spaced exposed ends 202, 204 of the pipeline 200, the housing 182 including: a first part 186 defining a first collar 187 for sealably receiving the first exposed end 202 of the pipeline 200, the first part 186 including a first aperture 188, and a second part 190 defining a second collar 191 for sealably receiving the second exposed end 204 of the pipeline 200, the second part 190 defining a second aperture 192 registered with the first aperture 191 to form passageway 184. The second part 188 includes a cylindrical section 194 configured to slidably receive the first part 186, whereby the first and second parts 186, 190 are configurable between the retracted configuration (as shown in FIG. 9) and an extended configuration in which the relative spacing between the first and second collars 187, 191 is increased relative to the retracted configuration for forming a sealed connection between the first and second exposed ends 202, 204. The isolator valve insert 180 also comprises a spring 192 mounted on cylindrical section 194 between the first and second collars 187, 191 for biasing the first and second parts 186, 190 to be in the extended configuration.

The isolator valve insert 180 further comprises a pair of push-fit gripping rings 196 located in the first and second collars 187, 191 for gripping an outer periphery of the first and second exposed ends 202, 204. Gripping rings 196 include a plurality of discrete gripping elements 197 spaced circumferentially around the gripping rings 196, the discrete gripping elements 197 being angled to ease removal of the isolator valve insert 180.

The isolator valve insert 180 further includes a valve mechanism 210 housed in the second part 190, the valve mechanism comprising a rotatable ball valve 212 configurable between a first configuration for allowing fluid to pass through passageway 184 and a second configuration for substantially preventing fluid from passing through passageway 184 in response to a 90 degree rotary input. Valve mechanism 210 further comprises a rotary actuator spindle 214 extending through the second part 190 for controlling the rotatable ball valve 212 and having a rotary interface 216 located on an upper surface of the second part 190.

In use, the isolator valve insert 180 is positioned between the first and second exposed ends 202, 204 of the pipeline while being held in the retracted configuration and, once registered with the first and second exposed ends 202, 204 of the pipeline 200, one of the first and second collars 187, 191 is released whereupon the first and second parts 186, 190 are urged by the spring 192 into the expanded configuration to seal the first and second collars 187, 191 against the first and second exposed ends 202, 204 of the pipeline 200.

O-ring seal pairing 220 seal opposed ends of the first and second parts 186, 190. O-ring seal pairing 225 located in the second part 190 seal opposed ends of valve mechanism 210. O-ring seal 230 located in the first part 186 seals the first part 186 and cylindrical section 194 in the second part 188.

FIGS. 9-19 show components forming a kit of parts 240 for installing isolator valve insert 180 into pipeline 200. The kit of parts 240 comprises isolator valve insert 180 as previously described, installation housing 250, pipe cutter 300, and exchange mechanism 350.

Installation housing 250 is constructed from plastics material (possibly transparent plastics material or plastics material including parts formed from transparent plastics material to provide a view through the installation housing) and comprises a main housing part 260 and a removable end housing part 270 together forming an elongate cylindrical chamber 255 configured to sealably receive pipe cutter 300 when connected to the pipeline 200. Main part 260 further defines first and second elongate passageways 264, 266 extending from the chamber 255, the first and second elongate passageways 264, 266 meeting to form an exchange space 268. First passageway 264 is configured to house isolator valve insert 180 prior to installation; second passageway 266 is configured to receive pipe cutter 300 after the pipeline 200 has been cut.

End housing part 270 is configured to be removable from the main housing part 260 to allow the portion 201 of pipeline 200 to be received in the installation housing 250. The installation housing 250 is configured to sealably enclose the portion 201 of pipeline 200. The end housing part 270 and main housing part 260 form first and second parts 256, 257, respectively, of a shaft 258. Installation housing 250 further comprises a pair of "C"-shaped rotatable locking members 259 coupled to the first part 256 of the shaft 258, the rotatable locking members 259 being movable between an unlocked position allowing separation of the first and second parts 256, 257 of the shaft 258 and a locked position preventing separation of the first and second parts 256, 257 of the shaft 258.

Pipe cutter 300 comprises a rotatable collar 310 configured to enclose the portion 201 of the pipeline 200 and defining a peripheral drive surface 320 around one end of the rotatable collar 310 comprising a plurality of angularly spaced teeth 322, the rotatable collar 310 including first and second collar parts 312, 314 having slidably interengageable profiles 313, 315 configured to lock together to prevent lateral separation of the first and second collar parts 312, 314. Once interengageable profiles 313, 315 are registered, relative movement between the first and second collar parts 312, 314 along a longitudinal axis of the pipeline 200 connects the first and second collar parts 312, 314 together.

The first collar part 312 additionally comprises a pair of laterally spaced cutter wheels 318, each defining a cutting surface 319 for scoring the pipeline 200 as the rotatable collar 310 in use rotates relative thereto. The cutter wheels 318 are each mounted on an axle (not shown) that is biased by means of a spring (also not shown) to engage the pipeline 200 as the rotatable collar 310 rotates. The first collar part 312 also comprises a keyhole-shaped slot 326 as described below.

Exchange mechanism 350 comprises a first movable casing part 360 configured to engage the second passageway 266 and a second movable casing part 400 configured to engage the first passageway 264.

First casing part 360 is slidable relative to the main housing part 260 and can be locked in place relative to the main housing part 260 by means of locking pin 362. First casing part 360 houses a rotary drive mechanism 370 for engaging peripheral drive surface 320 on pipe cutter 300. Rotary drive mechanism 370 comprises a toothed cog 272 for engaging with the peripheral drive surface 320, the toothed cog 272 being rotatable coupled to the first casing part 360 about an axis parallel to pipeline 200, and a rotatable shaft 374. Rotatable shaft 374 includes a leading end 375 coupled to a bevel gear 378 for driving toothed cog 272 and a trailing end 376 including a hexagonal rotary drive interface 379.

Rotary drive mechanism 370 further comprises an extractor rod 380 mounted in rotatable shaft 374 and movable relative to the rotatable shaft 374 between a retracted position and an extended position; a spring (not shown) biases extractor rod 380 in the retracted position. Extractor rod 380 has a leading end 382 including a locking element 384 for engaging slot 326 in pipe cutter 300 when the locking element 384 is registered with the slot 326 and the extractor rod 380 is in the extended position. Once the locking element 384 has engaged slot 326, pipe cutter 300 is rotatable between a first orientation in which the locking element 384 can return through slot 326 and a second orientation in which the locking element cannot pass through slot 326 in the rotatable collar 310. Once positioned in the second orientation, pipe cutter 300 can be withdrawn from chamber 255 (with the cut section of pipeline 200 in situ) and stowed in second passageway 266 out of the way of exchange space 268. In one embodiment, locking pin 362 may only be released once locking element 384 has engaged slot 326 and the pipe cutter 300 is in the second orientation.

Second casing part 400 is slidable relative to the main housing part 260 and defines a chamber 402 for receiving a part of isolator valve insert 180. Second casing part 400 further comprises a mechanism 410 comprising a pair of opposed sprung locking pins 415 configured to engage recesses (not shown) in main housing part 260 and an actuator 420 for selectively disengaging locking pins 415.

The kit of parts 240 may further comprise an indicator mechanism (not shown) for indicating that pipeline 200 has been cut through by pipe cutter 300. The indicator mechanism may comprise a sprung plate with a pair of spigots (e.g., colored spigots) located inside end housing part 270. When pipe cutter 300 is positioned in chamber 255 during cutting of pipeline 200, the pair of spigots rest against a transparent surface of the end housing part 270. When pipe cutter 300 moves away from end housing part 270 (once the pipeline 200 is cut, there will be some movement of the pipe cutter 300 within chamber 255), the spigots are urged away from the transparent surface of the end housing part 270 by the sprung plate in a visible manner, indicating that the pipe cutter has successfully cut through both ends of the pipeline 200.

Seals (not shown) in the installation housing 250 and exchange mechanism 300 contain fluid in the apparatus until the isolator valve insert 180 is sealably installed in the pipeline 200.

In use, pipe cutter 300 is first positioned around the pipeline 200 by positioning first and second collar parts 312, 314 around the pipeline 200 and slidably engaging interengageable profiles 313, 315. Once pipe cutter 300 is installed around pipeline 200, installation housing 250 is installed around pipe cutter 300 by positioning end housing part 270 and main housing part 260 around pipe cutter 300 and locking the end housing part 270 and main housing part 260 together by means of rotatable locking members 259. Once installation housing 250 is installed around pipe cutter 300, isolator valve insert 180 is compressed, tilted backward (to assist insertion angle into chamber 255), and placed inside first passageway 264 of main housing part 260. Since isolator valve insert 180 is sprung outward, it requires no means to hold it in second casing part 400. Locking pins 415 of mechanism 410 are then retracted by lifting actuator 420 upward to allow second casing part 400 to be inserted into first passageway 264. Once inserted, actuator 420 is released to splay locking pins 415, which hold second casing part 400 in position in the first passageway 264.

First casing part 360 is also sealably inserted into second passageway 266 and advanced so that toothed cog 272 engages with peripheral drive surface 320, whereupon locking pin 362 is deployed to lock first casing part 360 in position for the cutting stage. Rotation of hexagonal rotary drive interface 379 (e.g., via a ball end hexagonal key mounted on a battery-powered drill) rotates pipe cutter 300 to cut through pipeline 200. The cutting process is viewed through the housing and, once the pipeline 200 is cut through at both ends of pipe cutter 300, pipe cutter 300 is rotated by means of the hexagonal rotary drive interface 379 to register locking element 384 on extractor rod 380 with slot 326. Once registered, extractor rod 380 is advanced to the extended position to engage locking element 384 in slot 326. Once engaged in slot 326, pipe cutter 300 is rotated into the second orientation and locking pin 362 is disengaged allowing first casing part 360 to be slidingly withdrawn to remove pipe cutter 300 from chamber 255 (with the cut section of pipeline 200 in situ) and through past exchange space 268. Return pressure from the extractor rod spring acts to hold locking element 384 in the second orientation, while pipe cutter 300 is withdrawn. Internal pressure (from the pressurized pipeline 200) will assist to drive back first casing part 360 and extracted pipe cutter 300; retaining pins on first casing part 360 and reciprocating slots in main housing part 260 prevent system pressure from fully ejecting the first casing part 360 from the installation housing 250.

Once pipe cutter 300 has been withdrawn, insertion of isolator valve insert 180 is achieved by a two-part process. First, second casing part 400 is advanced into first passageway 264 to position isolator valve insert 180 in exchange space 268 and actuator 420 is depressed to angle rotary interface 216 on isolator valve insert 180 backward (e.g., so protuberant rotary interface 216 does not foul installation housing 250); subsequently, isolator valve insert 180 is advanced into chamber 255 by re-advancing first casing part 360 relative to the main housing part 260, whereupon the first and second parts 186, 190 of isolator valve insert 180 are urged by the spring 192 into the expanded configuration to seal the first and second collars 187, 191 against the first and second exposed ends 202, 204 of the pipeline 200. This completes the insertion of isolator valve insert 180 and rotatable locking members 259 may be released and the installation housing 250 removed.

Figure 20:
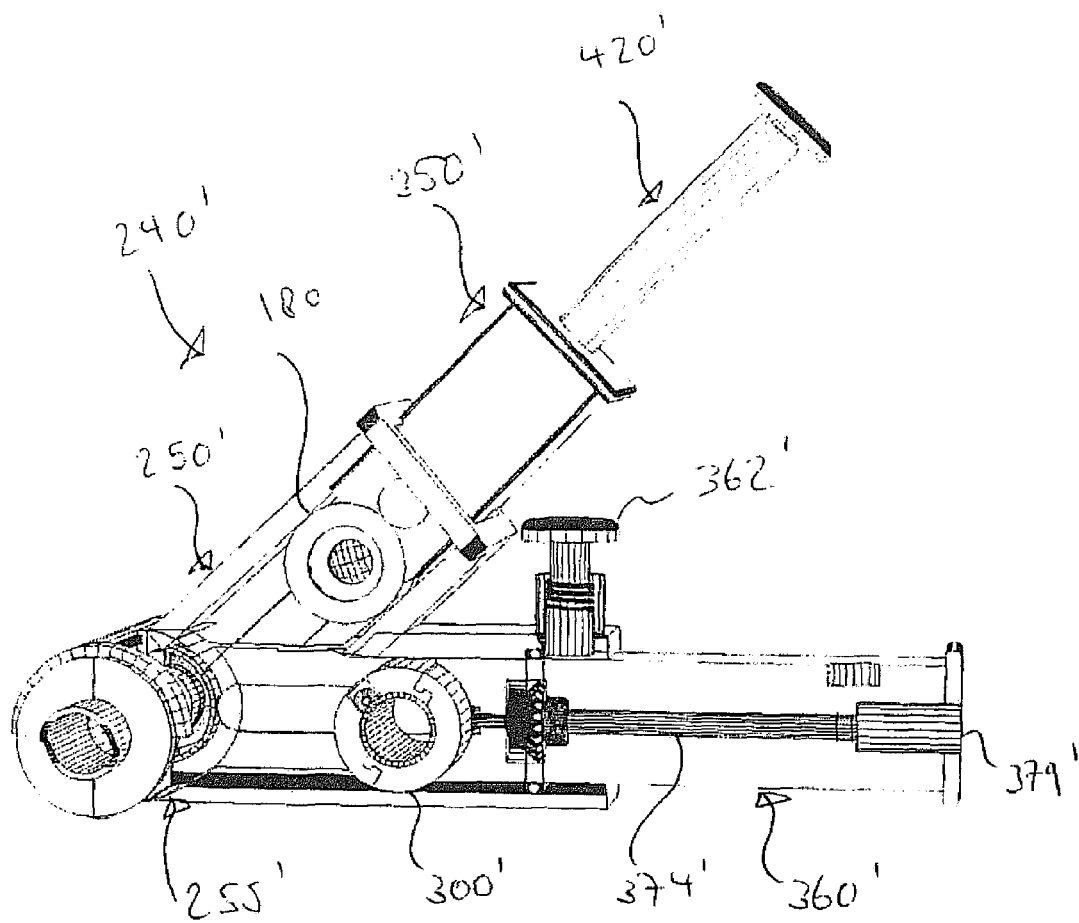
FIG. 20 is a schematic perspective view of a kit of parts for installing the pipe insert of FIG. 1 in a pipe according to a further embodiment of the present invention.

FIG. 20 shows a kit of parts 240' according to a further embodiment of the present invention. Kit of parts 240' is closely based on kit of parts 240 and common components are labeled accordingly. Kit of parts 240' is distinguished over kit of parts 240 by the provision of a "V"-shaped installation housing 250' with the vertex at the center of chamber 255' and a modified exchange mechanism 350'. Exchange mechanism 350' includes an extended actuator 420' to allow complete insertion of the isolator valve insert 180 with one direct movement and without involvement from first casing part 360'.

FIGS. 21-25 show isolation apparatus 10" for controlling flow of fluid through a pipe 20', comprising housing 40', a flow control device 100' and a rotary drive mechanism 150'''.

Housing 40' comprises a casing 42' comprising an upper casing part 44' and lower casing part 46' configured to be clamped together by means of shear bolts 49' to enclose a portion 22' of pipe 20'. Shear bolts 49' include a hexagonally profiled head 49A with a tapered neck 49B configured to shear when an applied installation torque exceeds a determined level. In addition, upper casing part 44' defines a pair of longitudinally opposed alignment flanges 44A for engaging corresponding recessed portions 46A of the lower casing part 46' to correctly align the two casing parts.

Upper and lower casing parts 44', 46' together define an elongate cylindrical chamber 48' configured to receive the portion 22' of the pipe 20', together with first and second longitudinally spaced annular gasket cavities 50', 52' for receiving upper and lower gasket parts 54', 56' for sealing, in combination with a pair of opposed planar gaskets 58A, 58B extending between the lower gasket parts 54', 56', opposed ends of the chamber 48' when the housing 40' is installed around pipe 20'. In the embodiment depicted, lower gasket parts 54', 56' and opposed planar gaskets 58A, 58B consist of a one-piece mounting fitted to the lower casing part 46'. Once the upper and lower casing parts 44', 46' are connected together, gasket parts 54', 56', 58A and 58B combine to form a homogenous seal between the housing 40' and opposed ends of the portion 22' of pipe 20'. Opposed planar gaskets 58A, 58B are formed by a pre-applied gasket compound positioned in curved channels formed in opposed lateral sides of an upper surface of the lower casing part 46'. Upper and lower gasket parts 54', 56' include complementary angled abutment faces 54A, 56A configured to provide a seal resistant to internal system pressure. Whereas flat mating abutment faces would tend to open under pressure, the angled form will tend to maintain a closed state under internal system pressure. Advantageously, the illustrated "thickly sectioned" sealing arrangement provides for a degree of tolerance when clamping the upper and lower casing parts 44', 46' together.

In an alternative embodiment (not illustrated), opposed planar gaskets 58A, 58B may be of a pre-applied gasket compound capable of being applied in thinner sections than a flat gasket material, and in profiles that do not lend themselves to a pre-cut gasket sheet that would then have to be positioned more precisely.

Chamber 48' defines a central cutter cavity 48A' for receiving flow control device 100'''. Prior to installation of flow control device 100''', opposed planar gaskets 58A, 58B extend into central cutter cavity 48' and the opposed planar gaskets 58A, 58B are cut square to the face of the cutter cavity 48A' by cutting surface 110" discussed below.

Upper casing part 44' further defines a cylindrical passageway 45' extending from chamber 48' to an opening 47A' on an upper surface of the upper casing part 44'. Lower casing part 46' further defines a substantially cylindrical compartment 47" extending from chamber 48' and registered with passageway 45'. Compartment 47" defines a curved lower surface 51 comprising curved corners 51A. Lower casing part 46 also includes a curved outer profile 51C to allow the apparatus to be rotatable around pipe 20' when located close to a wall (e.g., to allow the apparatus 10" to be installed in a first (e.g., more convenient) orientation relative to the pipe 20' and then moved into a desired second orientation relative to the pipe 20' after installation without having to remove the pipe 20' from its stanchions).

Upper and lower casing parts 44', 46' additionally define gripper ring parts 60', 62' for preventing relative movement between the housing 40' and the pipe 20' during installation (e.g., due to internal fluid pressure or rotational forces from the installation process). The use of gripper ring parts 60', 62' may provide a significantly more secure grip from the housing 40' than just clamping the pipe 20'. Gripper ring parts 60', 62' may be particularly useful for metal (e.g., copper) pipes and pipes comprising plastics material.

Figure 21:
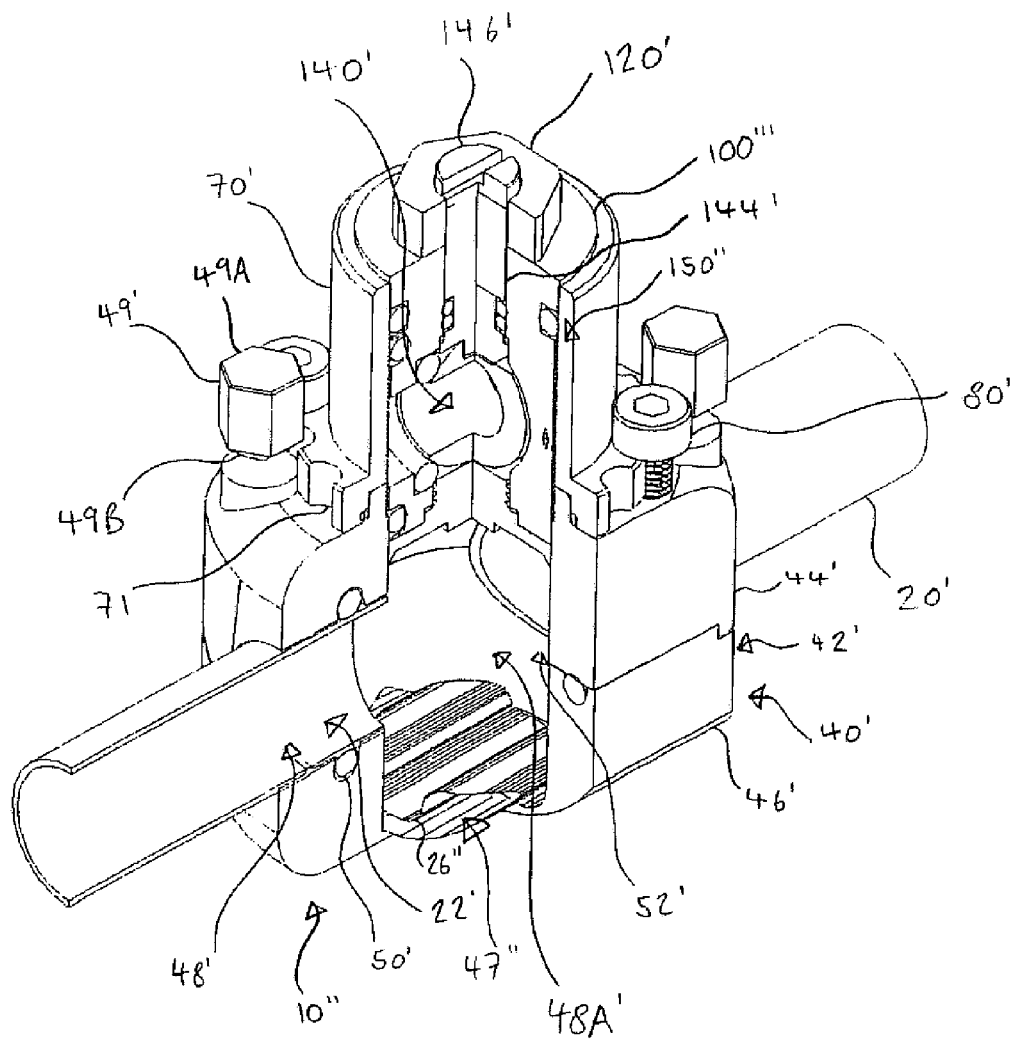
FIG. 21 is a schematic perspective view of apparatus comprising a housing and flow control device in accordance with a third embodiment of the present invention with the housing shown in ¼ cutaway view and the flow control device in a stowed position (for clarity) after the pipe has been cut.
Figure 22:
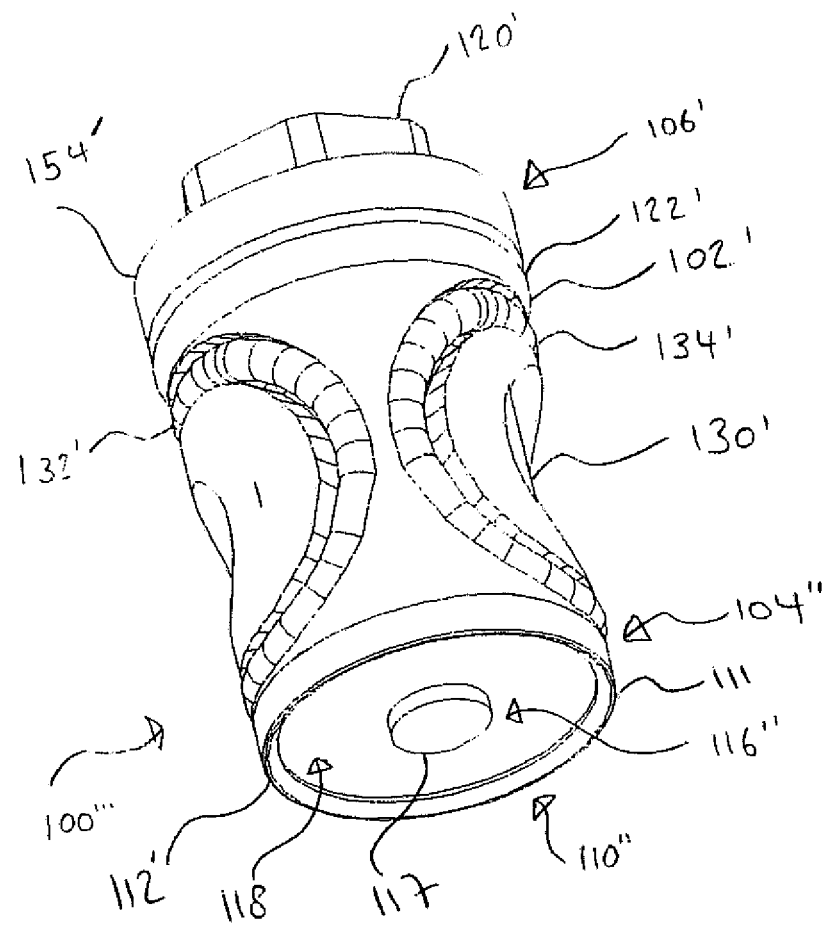
FIG. 22 is a schematic perspective view of the flow control device of FIG. 21.

Housing 40' further includes a separable collar 70' extending from an upper surface of upper casing part 44' and defining a cylindrical stowage space 72' adjacent chamber 48' for housing flow control device 100''' when in an uninstalled position (as shown in FIG. 21). Collar 70' includes a peripheral flange 74' defining an annular gasket cavity 76' housing a collar gasket 78' for sealing the collar 70' against the upper surface of upper casing part 44'. Retaining screws 80' are provided to lock collar 70' to the upper casing part 44'.

Flow control device 100''' comprises a substantially cylindrical body 102' having a leading end 104" and a trailing end 106'. Leading end 104" defines a cutting surface 110" comprising a peripheral blade wall 111 tapering to define a substantially annular leading cutting edge 112' defining a notional cutting plane substantially perpendicular to an axis of rotation of the body. In this way, a continuous cutting path is provided for removing the portion 22' of pipe 20' enclosed by the housing 40' in order to substantially minimize production of swarf during the cutting process.

Figure 23:
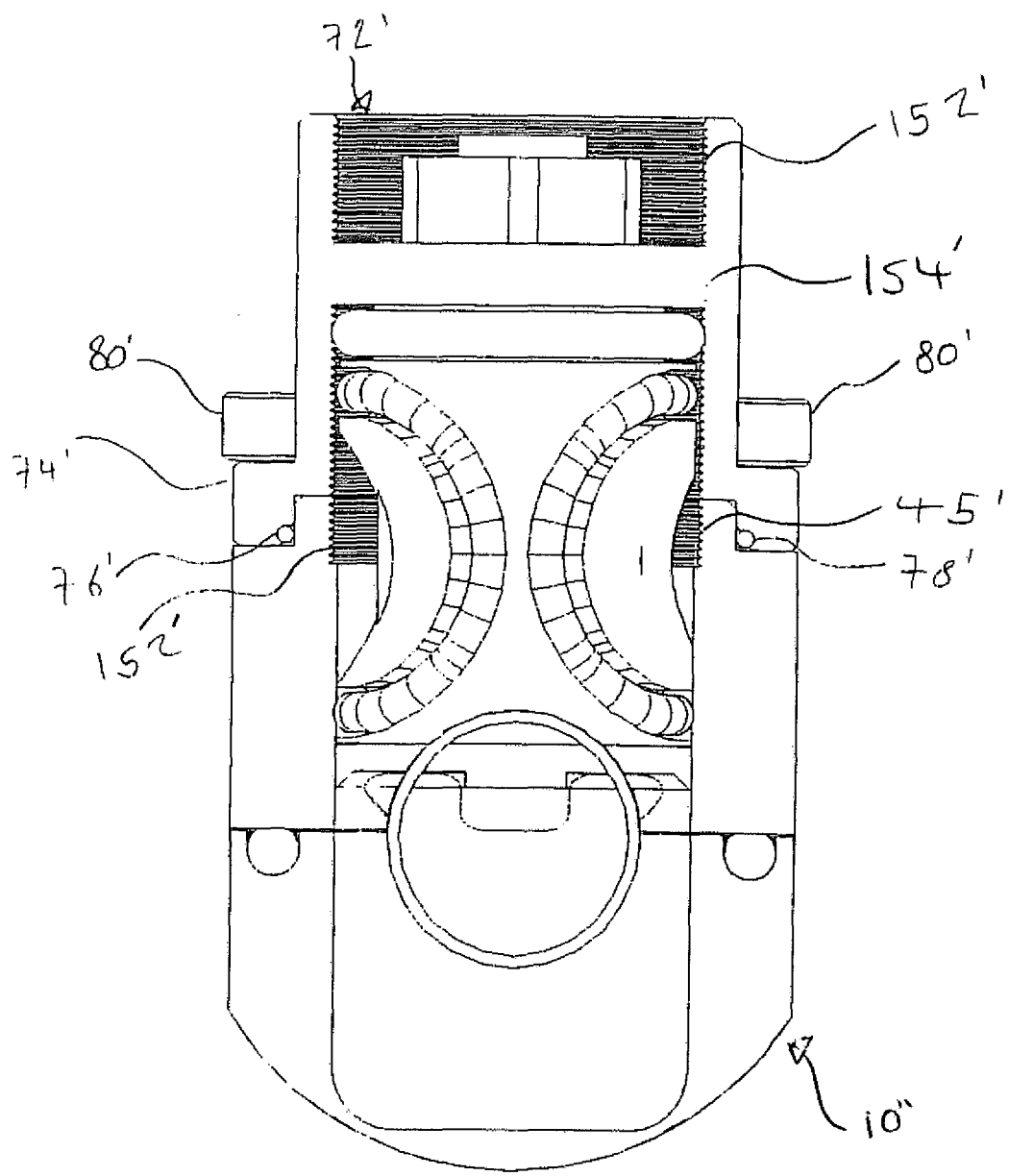
FIG. 23 is a schematic view of the apparatus of FIG. 21 positioned around a portion of a pipe with the flow control device in the stowed position and the housing shown in cross-section.
Figure 24:
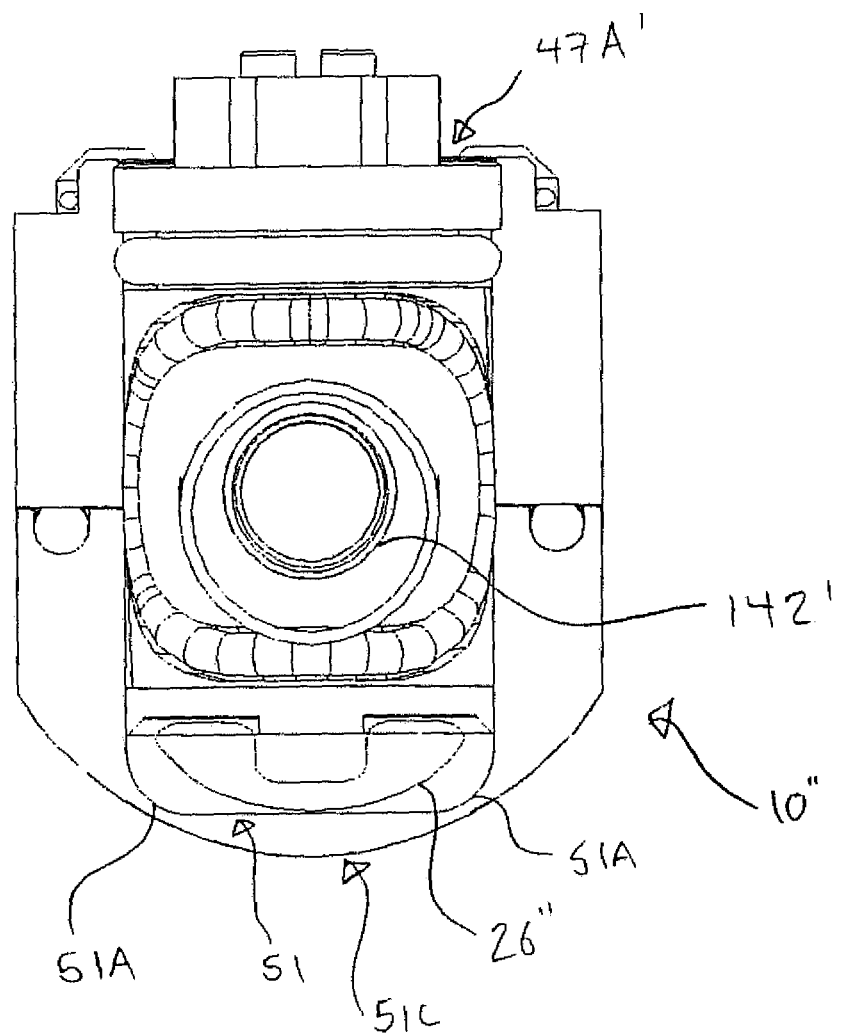
FIG. 24 is a schematic view of the apparatus of FIG. 21 with the collar of the housing removed after installation.
Figure 25:
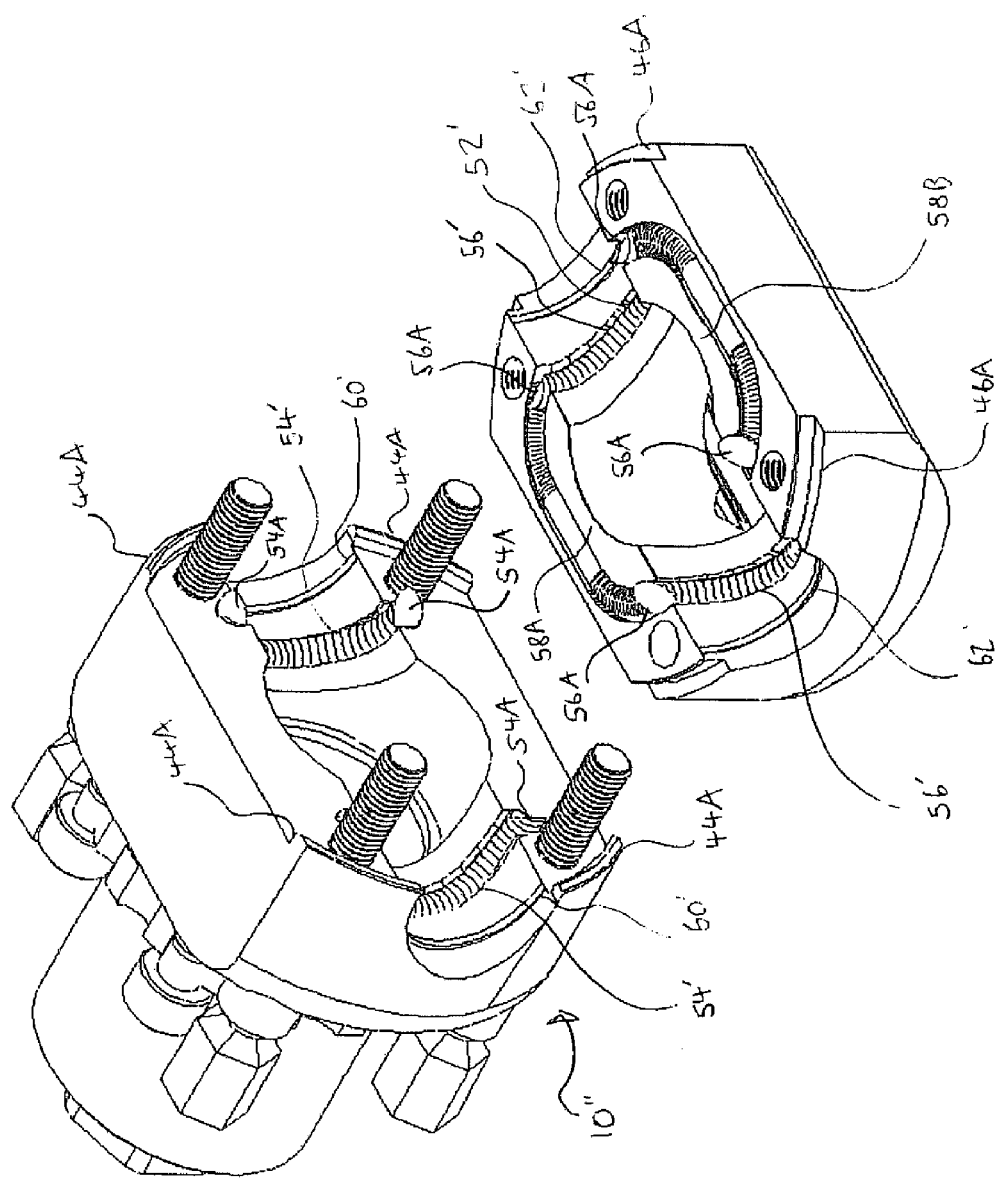
FIG. 25 is a schematic perspective view of the housing of the apparatus of FIG. 21 prior to installation.

Leading end 104" additionally defines a compression surface 116" comprising a substantially cylindrical protuberant member 117 extending from a central part of the body 102', the protuberant member 117 being configured to compress a central upper part of the section of pipe 20' causing the section of pipe to fold inward toward a lower part of the pipe section rather than spreading outward during the installation process. Protuberant member 117 is spaced from peripheral blade wall 111 by an annular recess 118 for receiving an uppermost portion of pipe 20' as the flow control device is installed as illustrated in FIG. 23.

The trailing end 106' also includes a hexagonal drive interface 120' for rotating the flow control device 100''' and an O-ring seal 122' for preventing passage of fluid past the trailing end 106'.

Flow control device 100''' comprises an open bore 130' extending through the body 102' configured to register with pipe 20'. O-ring seals 132', 134' provided on opposed lateral sides of the body 102' for forming a sealed passageway between opposed ends of the pipe 20' and the open bore 130'. The flow control device further comprises a valve mechanism 140' housed in the body 102' comprising a rotatable ball valve 142' configurable between a first configuration for allowing fluid to pass through open bore 130' and a second configuration for substantially preventing fluid from passing through the open bore 130' in response to a 90 degree rotary input. Valve mechanism 140' further comprises a rotary actuator spindle 144' extending through the body 102' for controlling the rotatable ball valve 142' and having a rotary interface 146' located at the trailing end 106'.

Rotary drive mechanism 150" comprises a pair of interengaging screw-threaded portions 152', 154'. Screw-threaded portion 152' extends along an inner surface of collar 70' and along an upper inner surface of passageway 45' in the upper casing 44'. Screw-threaded portion 154' extends along the trailing end 106' of body 102' between gasket 122' and hexagonal drive interface 120'.

Collar 70' includes a plurality of circumferentially spaced notches 71 around a periphery of flange 74' to accommodate retaining screws 80' and shear bolts 49' in order to prevent collar rotation. The use of such crenulations assists alignment of threads extending along the inner surface of collar 70' and upper casing 44'. When cutter thread 154' passes through collar 70' and engages with the thread extending along the inner surface of collar 70', the retaining screws 80' may be released. Once screw-threaded portion 154' has disengaged with the screw-threaded portion 152' extending along an inner surface of collar 70', collar 70' may be separated from upper casing 44'.

As with the first embodiment of the invention, in use, isolation apparatus 10'' is fitted to a portion 22' of pipe 20' by attaching upper and lower casing parts 44', 46' around the portion 22' and clamping the upper and lower casing parts 44', 46' together using shear bolts 49'. Once casing 42' is positioned around pipe 20', collar 70' housing flow control device 100''' is connected to upper casing part 44' by means of retaining screws 80'. Once collar 70' is connected to casing 42', flow control device 100''' is deployed by rotating hexagonal drive interface 120' (e.g., using an appropriate manually operated lever device or battery-operated drill insertion device for engaging hexagonal drive interface 120'). In response, a rotary input drive mechanism 150'' causes flow control device 100''' to rotate and move linearly downward from the stowed position in the collar 70' toward an installed position (as shown in FIGS. 2 and 3) in chamber 48'.

As the rotating leading end 104'' engages pipe 20', cutting surface 110'' cuts through the pipe 20' to remove a section 26'' of pipe 20' and form a gap in the pipe 20' into which the body 102' of the flow control device 100''' is sealably inserted once in the installed position. In addition, cutting surface 110'' will act to form a circular profile in planar gasket 58', which includes a portion 58A' extending into cutter cavity 48A'. Advantageously, providing a planar gasket 58' overlapping into the cutter cavity 48A' avoids the need to pre-size and align planar gasket 58' with the curved sealing face that will be met by the opposed O-ring seals 132', 134'.

While cutting surface 110'' cuts into the pipe 20', compression surface 116'' acts to compress the cut upper part of the pipe section 26'' in order to compress the pipe section 26'' in order to allow it to fit in cylindrical compartment 47'' in lower casing part 46', the cylindrical compartment 47'' having a depth that is approximately 40% of the diameter of pipe 20'. Once pipe section 26'' is severed from the pipe 20', the flow control device moves into the installed position with the leading end 104'' and compressed pipe section 26'' being moved into compartment 47'' out of the way of chamber 48'.

Once the flow control device 100''' is in the installed position, the rotatable ball valve 142' is movable between its open and closed configurations by turning rotary interface 146' through 90 degrees.

FIGS. 26-29 show modified isolation apparatus 10'''' for controlling flow of fluid through a pipe based on the apparatus 10'' of FIG. 21, apparatus 10''' comprising housing 40'', a flow control device 100'''' and a rotary drive mechanism 150'.

Housing 40'' comprises a casing 42'' comprising an upper casing part 44'' and lower casing part 46'', each formed from a low flexural modulus material (e.g., plastics material) and configured to be clamped together by means of shear bolts 49'' to enclose a portion of a pipe. For increased resistance to flexing during cutting of the pipe, casing 42'' further comprises a strengthening member 40A formed from a high flexural modulus material (e.g., steel) received in a recess formed in an upper surface of upper casing part 44'' and coupled to upper casing part 44'' by shear bolts 49'' engaging notches 40B formed at corners of strengthening member 40A. Upper casing part 44'' is placed under a number of forces during the installation process and residual forces after installation when in service, and flexure of the upper casing part 44'', even by a small degree, could result in leakage of fluid between the casing parts. Advantageously, the use of such a strengthening member allows housing 40'' to be used to install flow control device 100'''' in a stainless steel pipe with a casing 42'' formed from plastics material without any risk of fluid leakage. The use of casing parts formed from plastics material is advantageous for a variety of reasons and allows the use of self-tapping bolts that form their own thread in the lower housing as the upper and lower housings are coupled together.

Upper and lower casing parts 44'', 46'' together define an elongate cylindrical chamber 48'' configured to receive the portion of the pipe together with first and second longitudinally spaced annular gasket cavities 50'', 52'' for receiving upper and lower gasket parts 54'', 56'' for sealing, in combination with a pair of opposed planar gaskets (not shown) extending between the lower gasket parts 56'', opposed ends of the chamber 48'' when the housing 40'' is installed around the pipe.

Chamber 48'' defines a central cutter cavity 48A'' for receiving flow control device 100''''. Upper casing part 44'' further defines a cylindrical passageway 45'' extending from chamber 48'' to an opening 47A'' on an upper surface of the upper casing part 44''. Lower casing part 46'' further defines a substantially cylindrical compartment 47''' extending from chamber 48'' and registered with passageway 45''. Compartment 47''' defines a curved lower surface 51' comprising curved corners 51A'. Lower casing part 46'' also includes a curved outer profile 51C' to allow the apparatus to be rotatable around the pipe when located close to a wall.

Upper and lower casing parts 44'', 46'' additionally define gripper ring parts 60'', 62'' for preventing relative movement between the housing 40'' and the pipe during installation. The use of gripper ring parts 60'', 62'' may provide a significantly more secure grip from the housing 40'' than just clamping the enclosed pipe.

Housing 40'' further includes a separable collar 70'' extending from an upper surface of upper casing part 44'' and defining a cylindrical stowage space 72'' adjacent chamber 48'' for housing flow control device 100'''' when in an uninstalled position.

Flow control device 100''' comprises a substantially cylindrical body 102'' having a leading end 104''' and a trailing end 106''. Leading end 104''' defines a cutting surface 110''' comprising a peripheral blade wall 111' tapering to define a substantially annular leading cutting edge 112'' defining a notional cutting plane substantially perpendicular to an axis of rotation of the body. Leading end 104''' also defines a compression surface 116''' comprising a protuberant member 117' including a peripheral wall 117A tapering to define a substantially annular leading edge 117B and defining a central recess 117C. Substantially annular leading edge 117B defines a notional compression plane substantially perpendicular to the notional cutting plane defined by the cutting surface 110''' and recessed relative thereto. Protuberant member 117' is spaced from peripheral blade wall 111' by an annular recess 118' and is configured to compress a central upper part of the section of the pipe causing the section of pipe to fold inward toward a lower part of the pipe section rather than spreading outward during the installation process.

The trailing end 106" also includes a hexagonal drive interface 120" for rotating the flow control device 100'" and an O-ring seal 122" for preventing passage of fluid past the trailing end 106".

Flow control device 100"" comprises an open bore 130" extending through the body 102" configured to register with the enclosed pipe. O-ring seals 132", 134" provided on opposed lateral sides of the body 102" for forming a sealed passageway between opposed ends of the pipe and the open bore 130". The flow control device further comprises a valve mechanism 140" housed in the body 102" comprising a rotatable ball valve 142" configurable between a first configuration for allowing fluid to pass through open bore 130" and a second configuration for substantially preventing fluid from passing through the open bore 130" in response to a 90 degree rotary input. Valve mechanism 140" further comprises a rotary actuator spindle 144" extending through the body 102" for controlling the rotatable ball valve 142" and having a rotary interface 146".

Rotary drive mechanism 150'" comprises a pair of interengaging screw-threaded portions 152", 154". Screw-threaded portion 152" extends along an inner surface of collar 70" and along an upper inner surface of a collar part 40C of strengthening member 40A coupled to upper casing 44". Screw-threaded portion 154" extends along the trailing end 106" of body 102" between gasket 122" and hexagonal drive interface 120".

Figure 26:
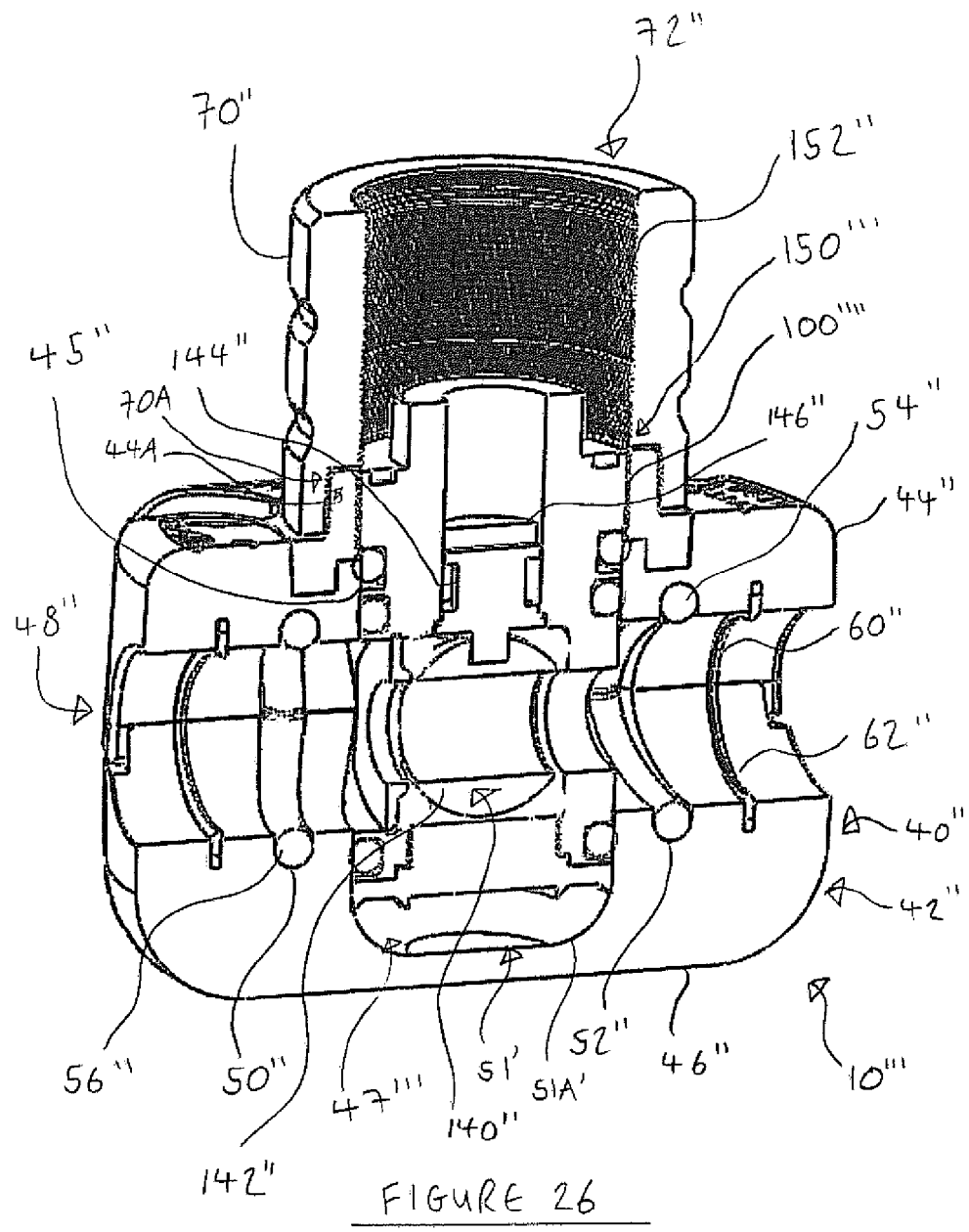
FIG. 26 is a schematic cross-sectional perspective view of apparatus comprising a housing and flow control device in accordance with a fourth embodiment of the present invention with the flow control device in an installed position.
Figure 27:
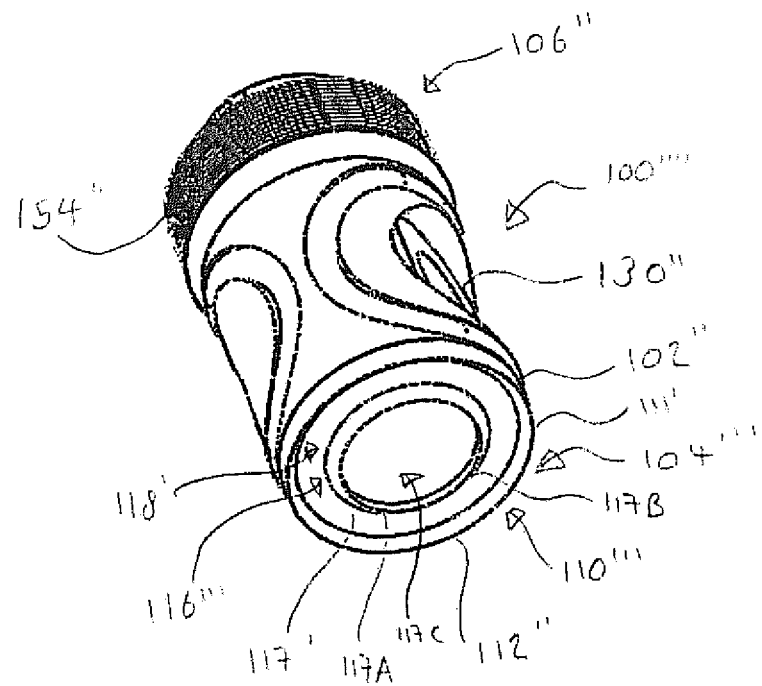
FIG. 27 is a schematic perspective view of the flow control device of FIG. 26.
Figure 28:
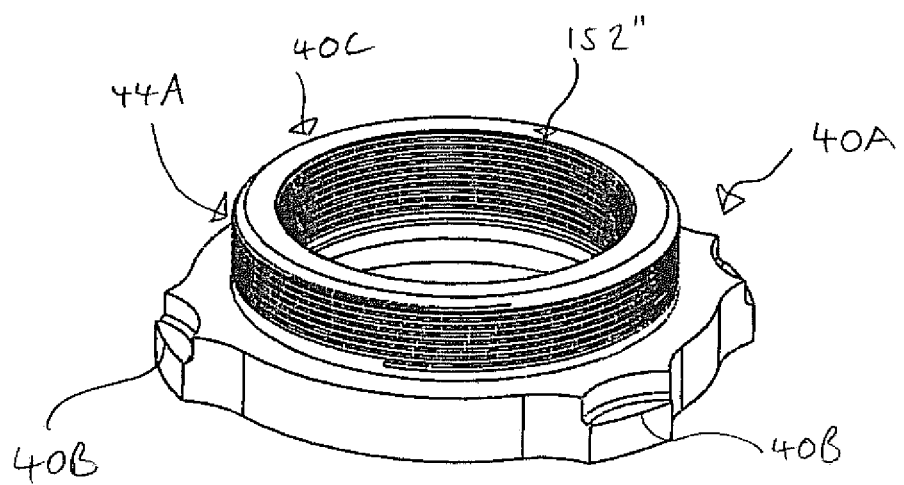
FIG. 28 is a schematic perspective view of a component of the apparatus of FIG. 26.
Figure 29:
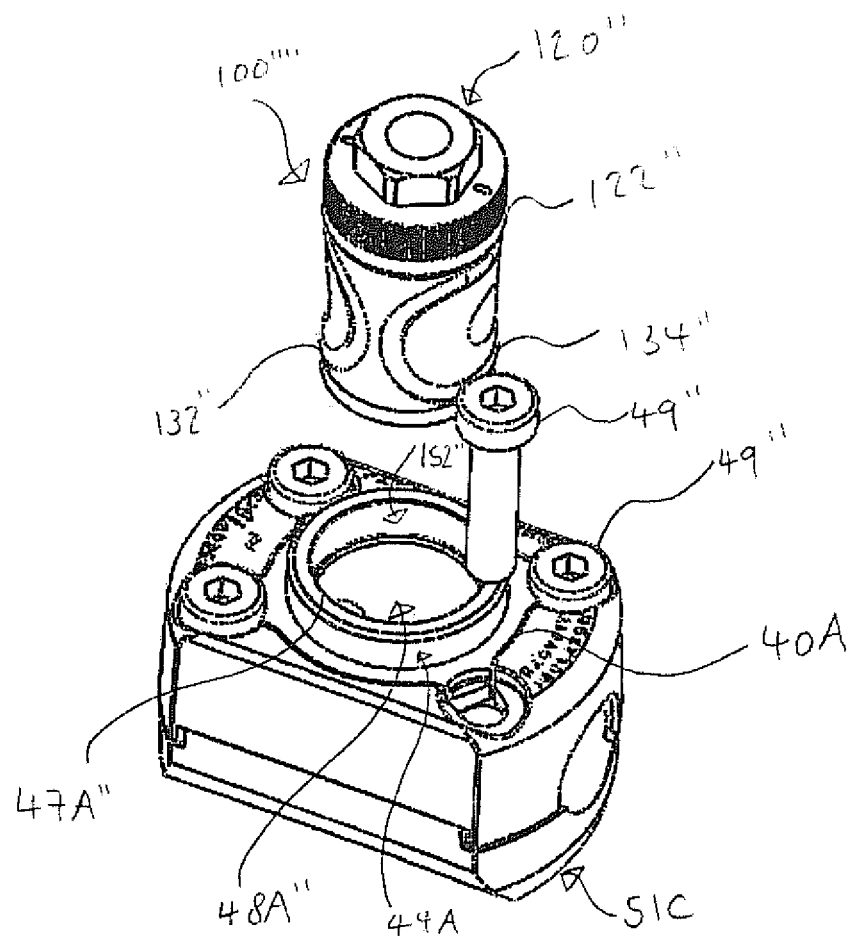
FIG. 29 is a schematic perspective view of parts of the apparatus of FIG. 26 when partially disassembled.

As shown in FIG. 26, collar 70" and strengthening member 40A comprise a further pair of interengaging screw-threaded portions 70A, 44A, respectively spaced radially outward from interengaging screw-threaded portions 152", 154" for removably attaching collar 70" to casing 42". Screw-threaded portion 70A extends along an inner surface of collar 70" and is configured to engage screw-threaded portion 44A formed along an outer surface of collar part 40C of strengthening member 40A. The further pair of interengaging screw-threaded portions 70A, 44A are synchronized with screw-threaded portion 152" extending along the inner surface of collar 70" and along an inner surface of collar part 40C of strengthening member 40A (e.g., with the relative angular starting position of the section of screw-threaded portion 152" located on the inner surface of collar 70" relative to the starting position of screw-threaded portion 70A corresponding to the relative angular starting position of the section of screw-threaded portion 152" on the inner surface of collar part 40C relative to the starting position of screw-threaded portion 44A). In this way, correct alignment of the screw-threaded portions 152" located on the inner surface of the collar 70" and the inner surface of collar part 40C of strengthening member 40A (which have the same pitch as interengaging screw-threaded portions 70A, 44A in this example) may be achieved without the need for accurate rotational positioning of the collar relative to casing 42". The advantage of this design over apparatus 10" is that a smaller diameter of removable collar may be achieved since no crenulations need to be formed around the periphery of the removable collar and assembly is simplified, as no thought or action needs to be given to the alignment of the two parts of screw-threaded portion 152".

The invention claimed is:

1. An apparatus for controlling flow of fluid through a pipe, comprising:
    a housing configured to enclose a portion of a pipe through which fluid flow is to be controlled, the housing comprising:
        a first part defining a chamber configured to receive the portion of the pipe; and
        a second part extending from the first part, the second part defining a stowage space adjacent the chamber;
    a flow control device movable from a stowed position in the stowage space to an installed position in the chamber for selectively controlling flow through the housing, the flow control device comprising a body having a leading end defining a cutting surface configured to rotate relative to the housing as the flow control device moves from the stowed position to the installed position for removing a section of the pipe enclosed by the housing as the flow control device moves from the stowed position to the installed position in order to form an opening in the pipe for receiving the flow control device when in the installed position, the cutting surface comprising a peripheral wall defining a central recess and the leading end further comprising a compression surface located within the recess defined by the peripheral wall of the cutting surface, the compression surface being configured to compress an upper part of the section of pipe whilst a lower part of the section of pipe is being cut by the cutting surface; and
    a rotary drive mechanism for moving the flow control device from the stowed position to the installed position in response to a rotary input;
    wherein the compression surface comprises a protuberant member extending from a central part of the body.

2. The apparatus according to claim 1, wherein the cutting surface defines a cutting plane substantially perpendicular to an axis of rotation of the body and the protuberant member comprises an outermost surface extending substantially along or through the cutting plane.

3. The apparatus according to claim 1, wherein:
    when the flow control device is in the installed position, the body is selectively configurable between an open configuration for permitting flow through the housing and a closed configuration for substantially preventing flow through the housing; and
    the second part comprises a collar configured to be removable from the first part when the flow control device is in the installed position.

4. The apparatus according to claim 1, wherein the protuberant member comprises a peripheral wall defining a central recess.

5. The apparatus according to claim 1, wherein the peripheral wall of the cutting surface defines a substantially annular leading edge.

6. The apparatus according to claim 1, wherein the peripheral wall of the cutting surface defines a pair of circumferentially-spaced curved blades forming a scalloped profile.

7. The apparatus according to claim 1, wherein the peripheral wall of the cutting surface defines a plurality of circumferentially-spaced teeth.

8. The apparatus according to claim 1, wherein the first part further comprises a compartment adjacent the chamber for receiving the leading end of the flow control device and removed section of pipe when the flow control device is in the installed position.

9. The apparatus according to claim 8, wherein the compartment has a depth that is: less than substantially 70% of a corresponding depth of the chamber; less than substantially 60% of the corresponding depth of the chamber; less than substantially 50% of the corresponding depth of the chamber; or less than substantially 40% of the corresponding depth of the chamber.

10. The apparatus according to claim 1, wherein the first part comprises at least one strengthening member.

* * * * *